(12) United States Patent
Sakata

(10) Patent No.: US 7,894,720 B2
(45) Date of Patent: Feb. 22, 2011

(54) SHOOTING SYSTEM AND INTERFACE BOX

(75) Inventor: Noriaki Sakata, Kanagawa (JP)

(73) Assignee: Sony Corporation, Tokyo (JP)

( * ) Notice: Subject to any disclaimer, the term of this patent is extended or adjusted under 35 U.S.C. 154(b) by 479 days.

(21) Appl. No.: 11/983,964

(22) Filed: Nov. 13, 2007

(65) Prior Publication Data

US 2008/0260377 A1  Oct. 23, 2008

(30) Foreign Application Priority Data

Nov. 14, 2006 (JP) ............................ P2006-307745
Nov. 14, 2006 (JP) ............................ P2006-307772

(51) Int. Cl.
*G03B 17/02* (2006.01)
(52) U.S. Cl. .................. 396/535; 396/541; 352/242
(58) Field of Classification Search ................ 396/535, 396/541; 352/242
See application file for complete search history.

(56) References Cited

U.S. PATENT DOCUMENTS 6,327,001 B1 * 12/2001 Yamagishi .................. 348/552

FOREIGN PATENT DOCUMENTS

| JP | 5 75904 | 3/1993 |
|---|---|---|
| JP | 5-341360 | 12/1993 |
| JP | 6-84333 | 3/1994 |
| JP | 10 507851 | 7/1998 |
| JP | 2001-45351 | 2/2001 |

* cited by examiner

*Primary Examiner*—Rodney E Fuller
(74) *Attorney, Agent, or Firm*—Frommer Lawrence & Haug LLP; William S. Frommer

(57) ABSTRACT

A shooting system includes a main body, a recording/reproducing unit, and an interface box. The main body includes a first housing having a plurality of outer surfaces of different orientations. Two different outer surfaces of the first housing provide first and second attachment parts, each attachment part having main-body-side connectors. The recording/reproducing unit has a second housing which constitutes an exterior thereof and provides a recording/reproducing-unit-side attachment part attachable to both the first and second attachment parts. The recording/reproducing-unit-side attachment part provides recording/reproducing-unit-side connectors connectable to the main-body-side connectors. The interface box has a third housing which constitutes an exterior thereof and provides an interface-box-side attachment part attachable to both the first and second attachment part. The interface-box-side attachment part provides interface-box-side connectors connectable to the main-body-side connectors.

12 Claims, 34 Drawing Sheets

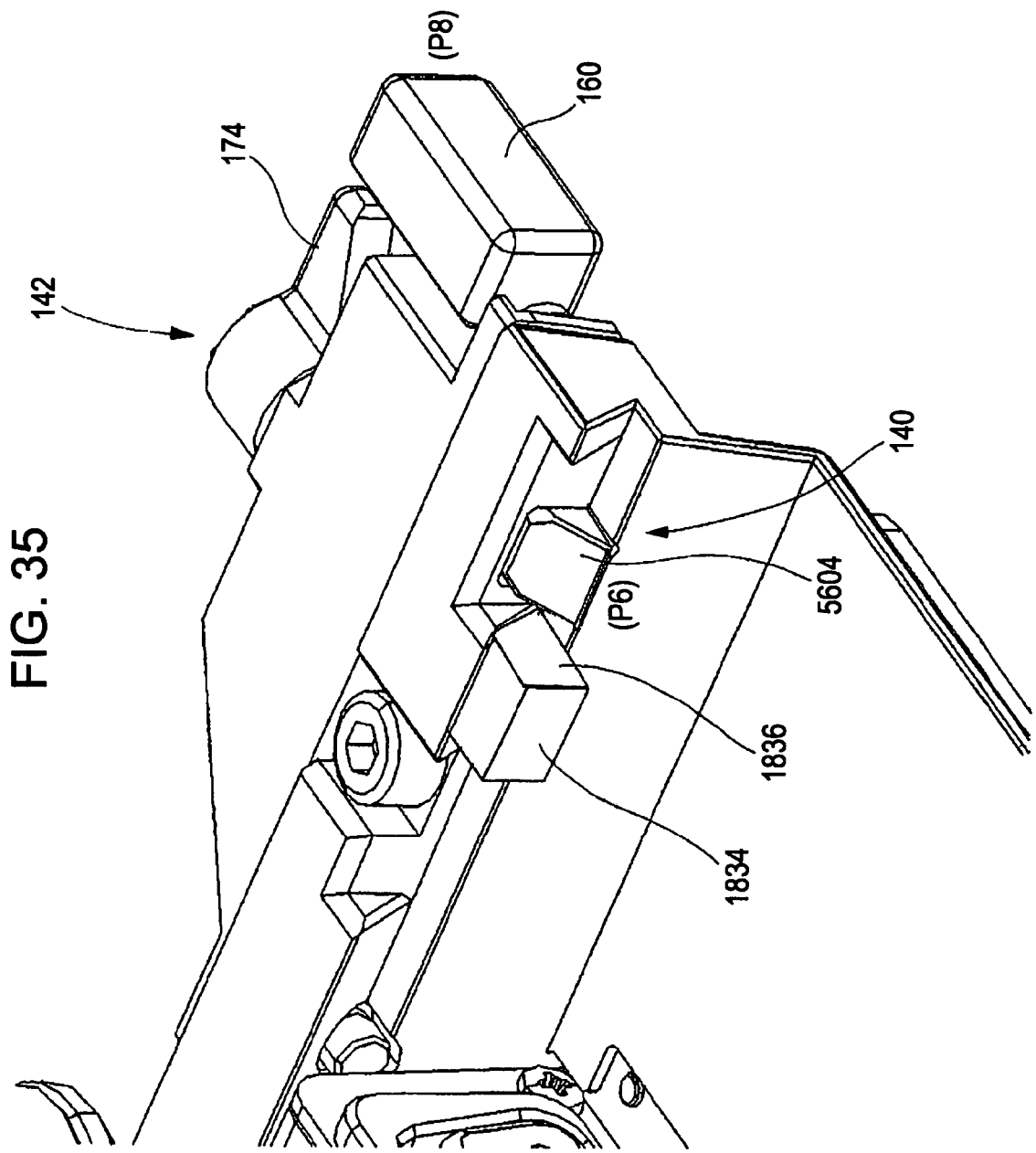

SHOOTING SYSTEM AND INTERFACE BOX

CROSS REFERENCES TO RELATED APPLICATIONS

The present invention contains subject matter related to Japanese Patent Applications JP 2006-307745 and JP 2006-307772 filed in the Japanese Patent Office on Nov. 14, 2006, the entire contents of which are incorporated herein by reference.

BACKGROUND OF THE INVENTION

1. Field of the Invention

The present invention relates to a shooting system and an interface box.

2. Description of the Related Art

As an image pickup apparatus for shooting movies, there has been used a film camera which includes a lens barrel having an imaging optical system, a main body to which the lens barrel is attached, and a film cartridge including a film and removably attached to the main body (see PCT Japanese Translation Patent Publication No. 10-507851).

In the main body, the film drawn out of the film cartridge, running, and on which a subject image guided by the imaging optical system is formed is exposed to light.

Such a film camera is configured such that a film cartridge is attachable to either an upper part or a rear part of a main body. Therefore, a position to which the film cartridge is attached during use of the film camera is changed depending on the shooting angle or such that the film camera can be easily installed on a shooting assist device, such as a tripod or a camera dolly.

In recent years, it has been demanded that a video camera using a magnetic tape, optical disk, hard disk, or the like as a recording medium be used for shooting movies.

However, video cameras typically used in television stations and the like have a larger outer dimension than that of a known film camera in a front-and-rear direction (see Japanese Unexamined Patent Application Publication No. 5-75904).

Therefore, it is possible to divide such a video camera into a main body and a recording/reproducing unit, and allow the recording/reproducing unit to be selectively attached to either an upper part or a rear part of a housing of the main body. The main body is configured to pick up a subject image guided by a lens barrel and generate picture data to be recorded. The recording/reproducing unit is configured to record the generated picture data in a recording medium.

In this case, for transmission and reception of signals between the main body and the recording/reproducing unit, it is necessary to provide main-body-side connectors in the upper and rear parts of the housing of the main body and a recording/reproducing-unit-side connector connected to one of the main-body-side connectors on a housing of the recording/reproducing unit.

SUMMARY OF THE INVENTION

However, in this configuration, when the recording/reproducing-unit-side connector is connected to one of the two main-body-side connectors, the other main-body-side connector is exposed outward. This may cause, for example, dust to adhere to the exposed main-body-side connector.

To prevent such an inconvenience, it is possible to protect, from dust, the main-body-side connector to which the recording/reproducing unit is not connected by covering this main-body-side connector with a cover.

However, when the main-body-side connector to which the recording/reproducing unit is not connected is covered with a cover, functions of the main-body-side connectors cannot be fully used.

The present invention addresses the above-described circumstances by providing a shooting system and an interface box which allow the use of functions of the main-body-side connector to which the recording/reproducing unit is not connected and are advantageous in enhancing the added value of the shooting system.

A shooting system according to an embodiment of the present invention includes a main body configured to perform shooting to generate picture data, a recording/reproducing unit configured to record and reproduce the picture data, and an interface box configured to perform transmission and reception of signals and/or power between the main body and an external device. The main body includes a first housing having a plurality of outer surfaces of different orientations. Two different outer surfaces of the first housing provide a first attachment part and a second attachment part, each attachment part having main-body-side connectors. The recording/reproducing unit has a second housing constituting an exterior thereof. The second housing provides a recording/reproducing-unit-side attachment part attachable to both the first attachment part and the second attachment part. The recording/reproducing-unit-side attachment part provides recording/reproducing-unit-side connectors connectable to the main-body-side connectors. The interface box has a third housing constituting an exterior thereof. The third housing provides an interface-box-side attachment part attachable to both the first attachment part and the second attachment part. The interface-box-side attachment part provides interface-box-side connectors connectable to the main-body-side connectors.

An interface box according to another embodiment of the present invention includes a third housing constituting an exterior thereof. The third housing includes an interface unit configured to perform transmission and reception of signals and/or power between an image pickup apparatus and an external device. The third housing provides an interface-box-side attachment part attachable to both a first attachment part and a second attachment part provided in a housing of the image pickup apparatus. The interface-box-side attachment part provides interface-box-side connectors connectable to main-body-side connectors provided in both the first attachment part and the second attachment part.

In the embodiments of the present invention described above, the recording/reproducing unit is attached to one of the first and second attachment parts of the main body, while the interface box is attached to the other of the first and second attachment parts. This makes it possible to prevent dust from adhering to the main-body-side connector without requiring a cover.

Additionally, the interface box allows transmission and reception of signals and/or power between the main body and external device, allows the use of functions of the main-body-side connector to which the recording/reproducing unit is not connected, and thus is advantageous in enhancing the added value of the shooting system.

BRIEF DESCRIPTION OF THE DRAWINGS

FIG. 35 also illustrates the operation of the locking mechanism and pressing mechanism.

DESCRIPTION OF THE PREFERRED EMBODIMENTS

First Embodiment

Embodiments of the present invention will now be described with reference to the drawings.

Figure 1:
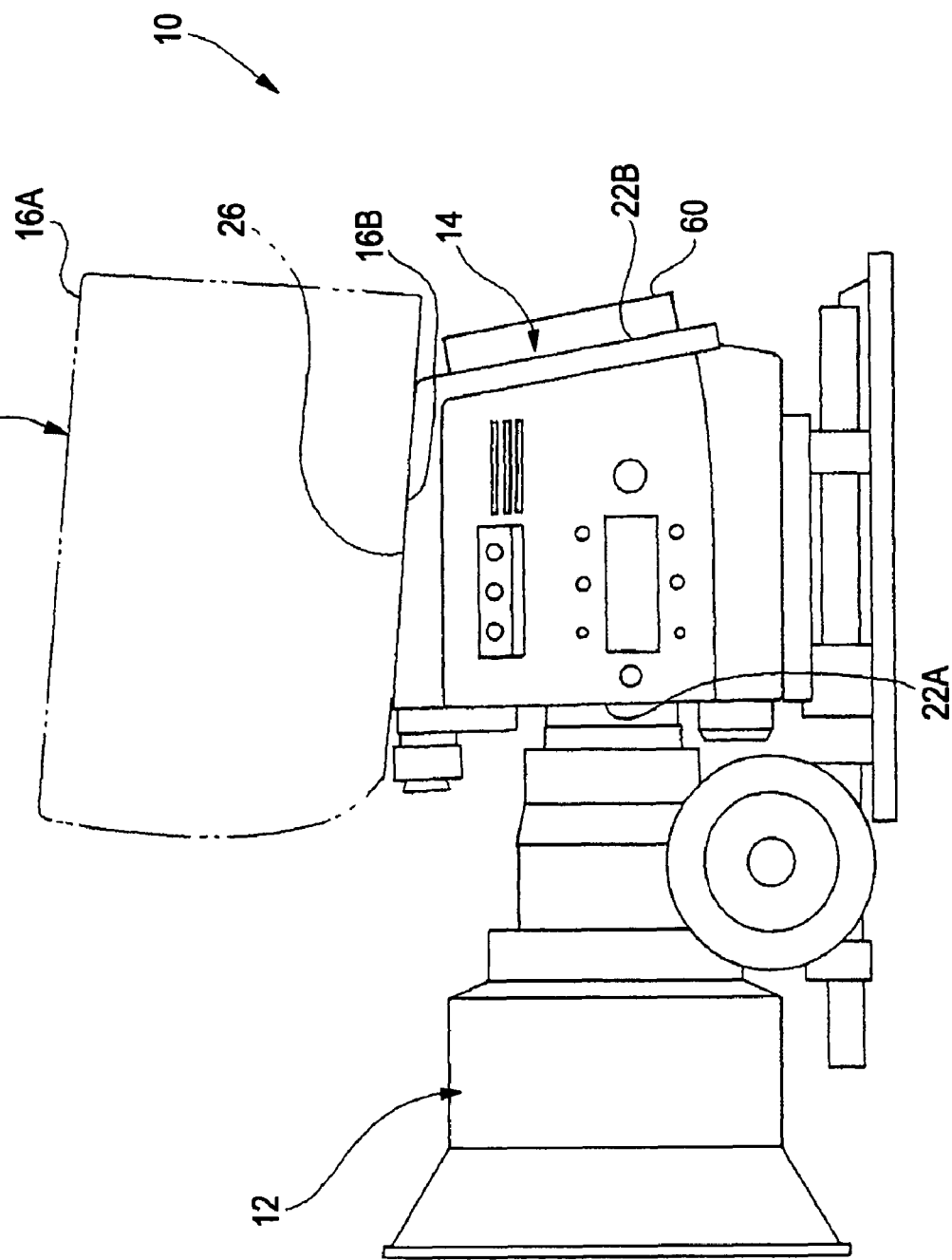
FIG. 1 is a right side view of an image pickup apparatus in a shooting system according to a first embodiment of the present invention.
Figure 2:
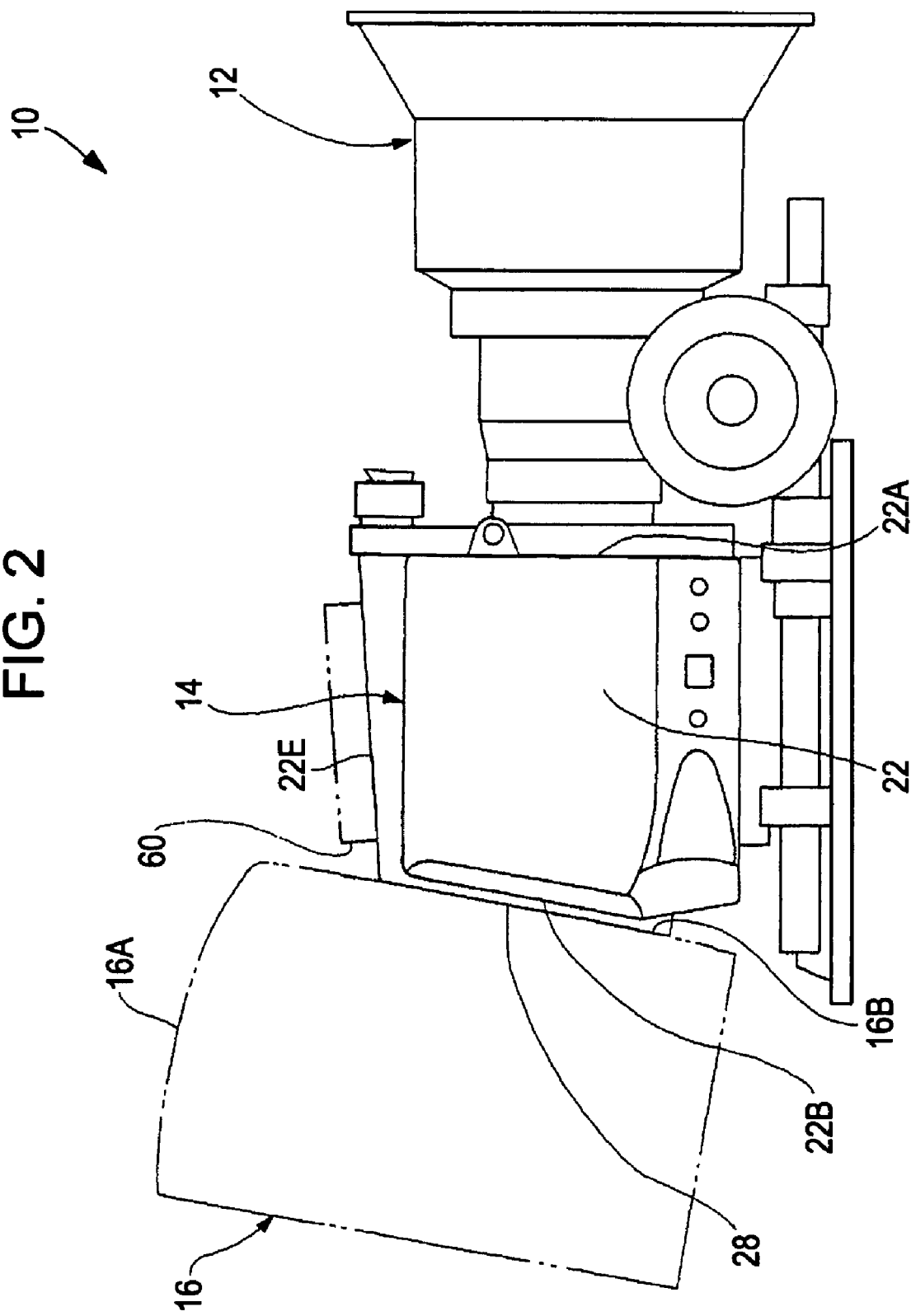
FIG. 2 is a left side view of the image pickup apparatus.
Figure 3:
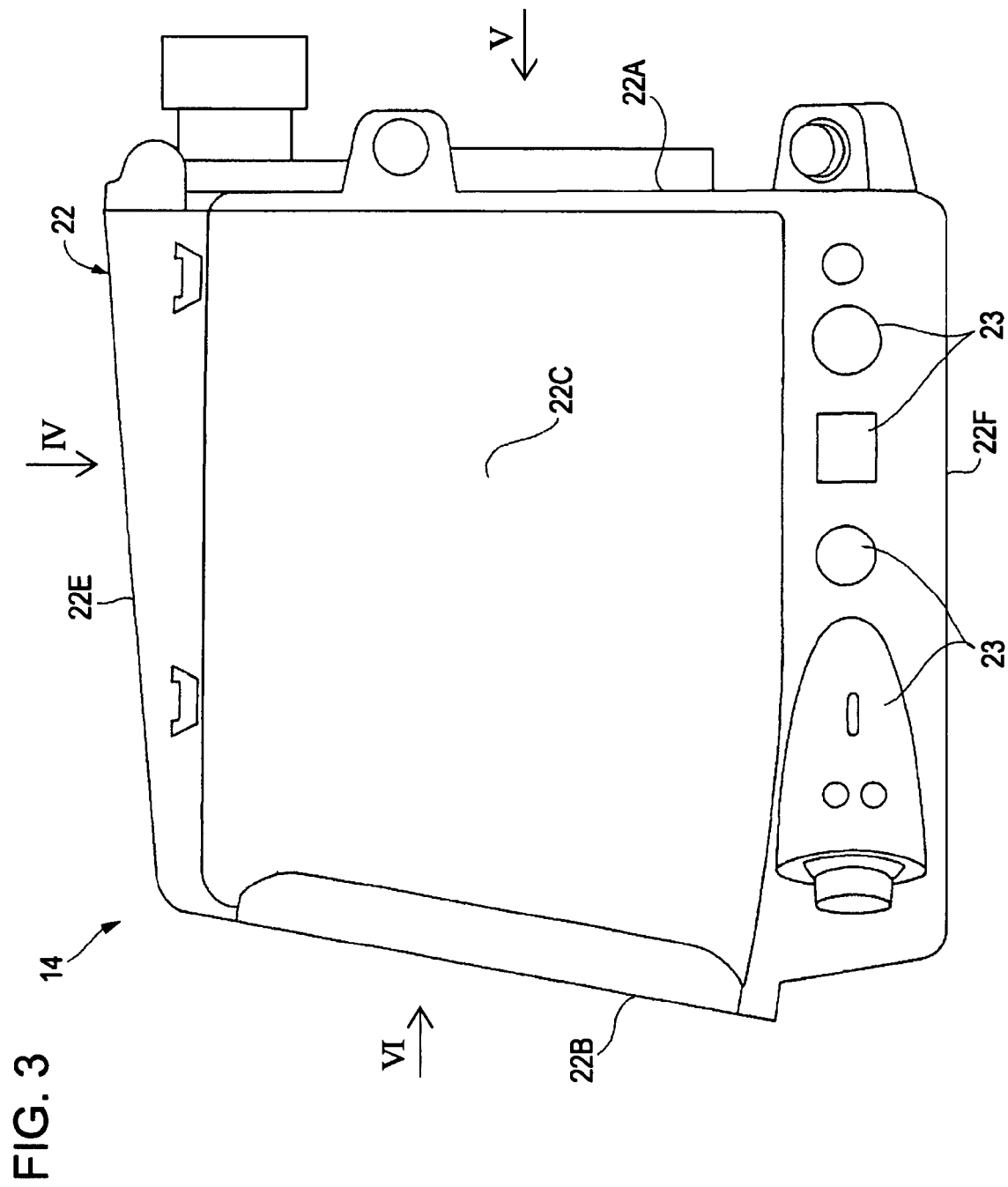
FIG. 3 is a left side view of a main body of the image pickup apparatus.
Figure 4:
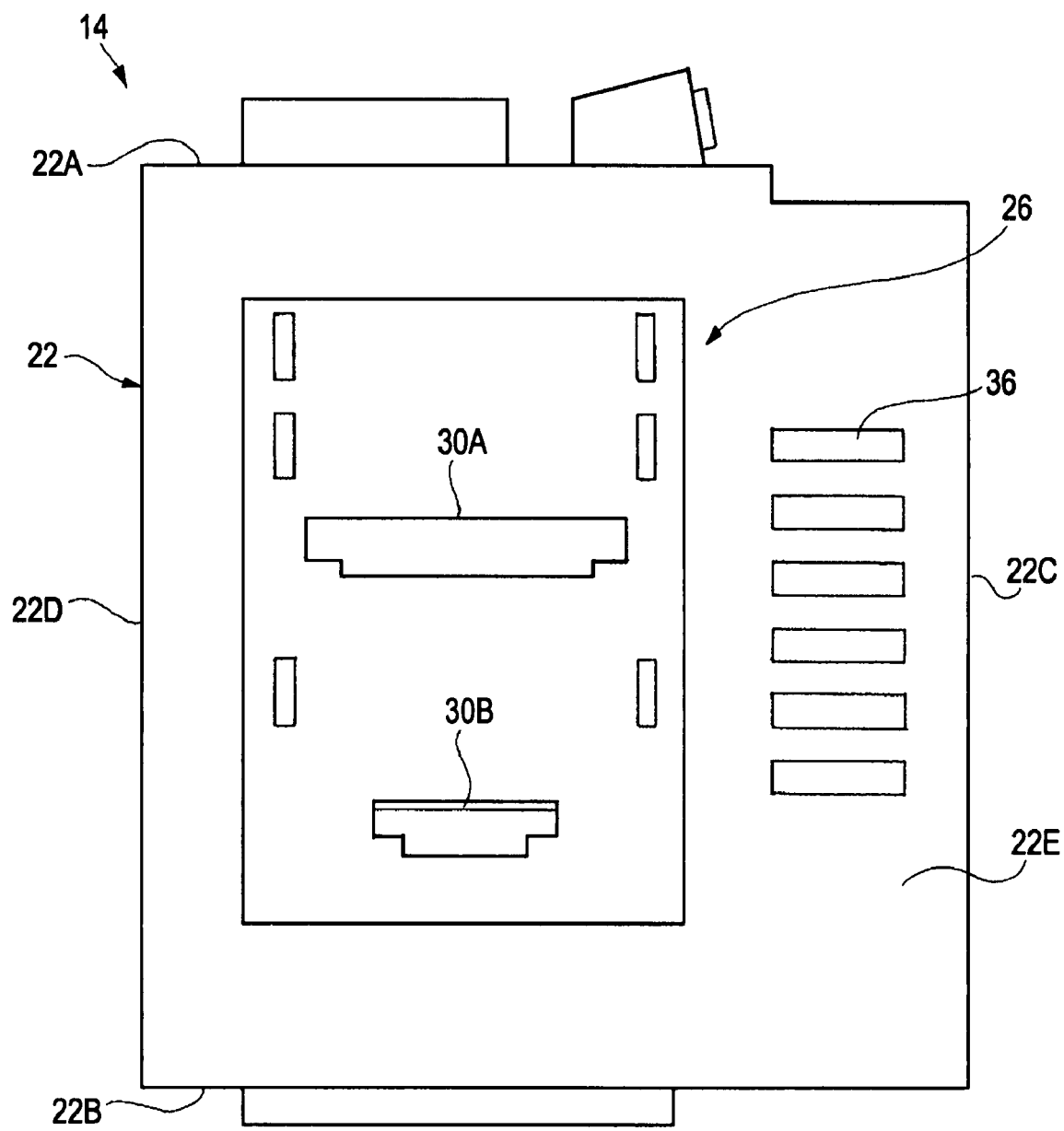
FIG. 4 illustrates the main body as viewed from the direction of arrow IV of FIG. 3.
Figure 5:
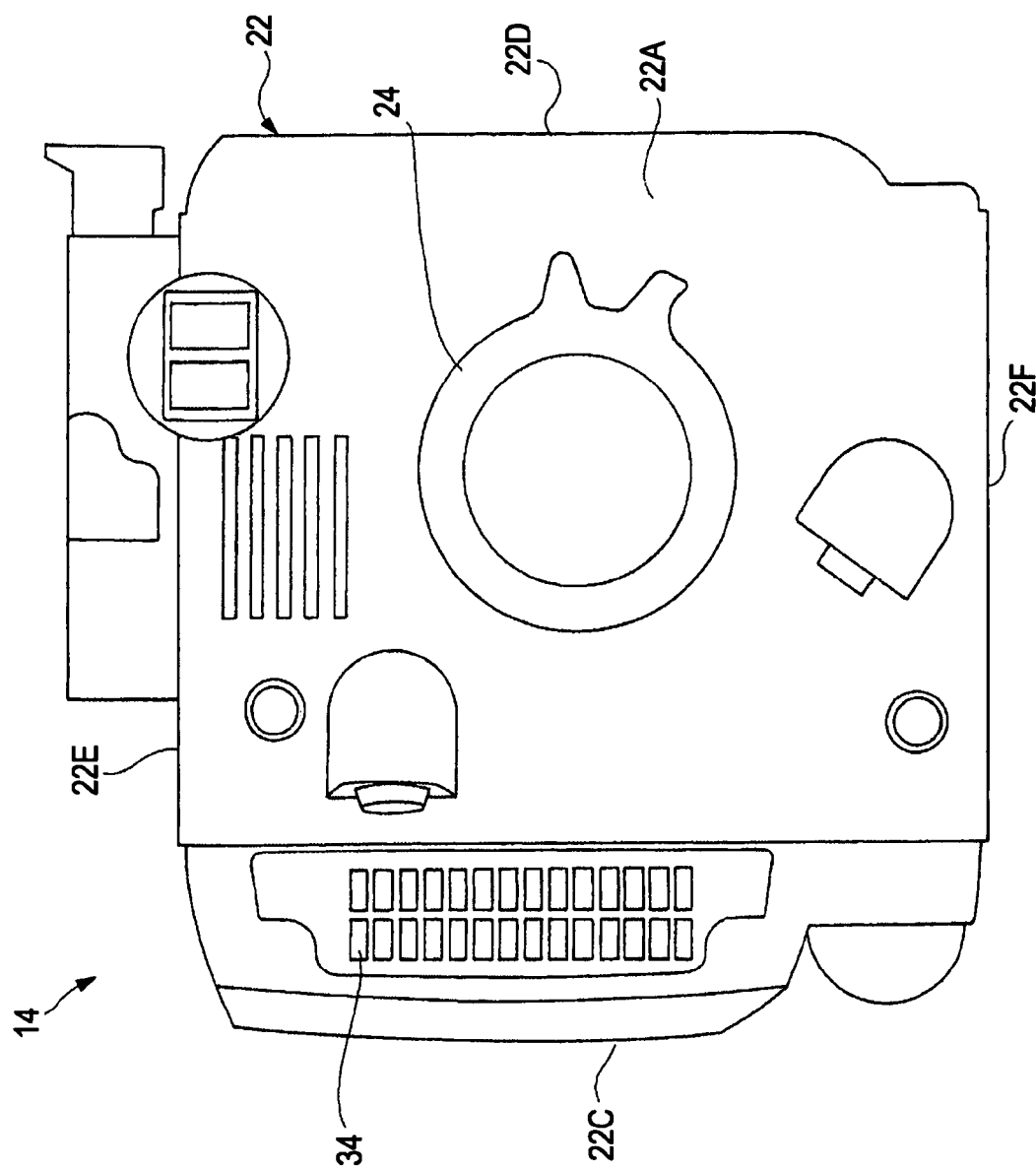
FIG. 5 illustrates the main body as viewed from the direction of arrow V of FIG. 3.
Figure 6:
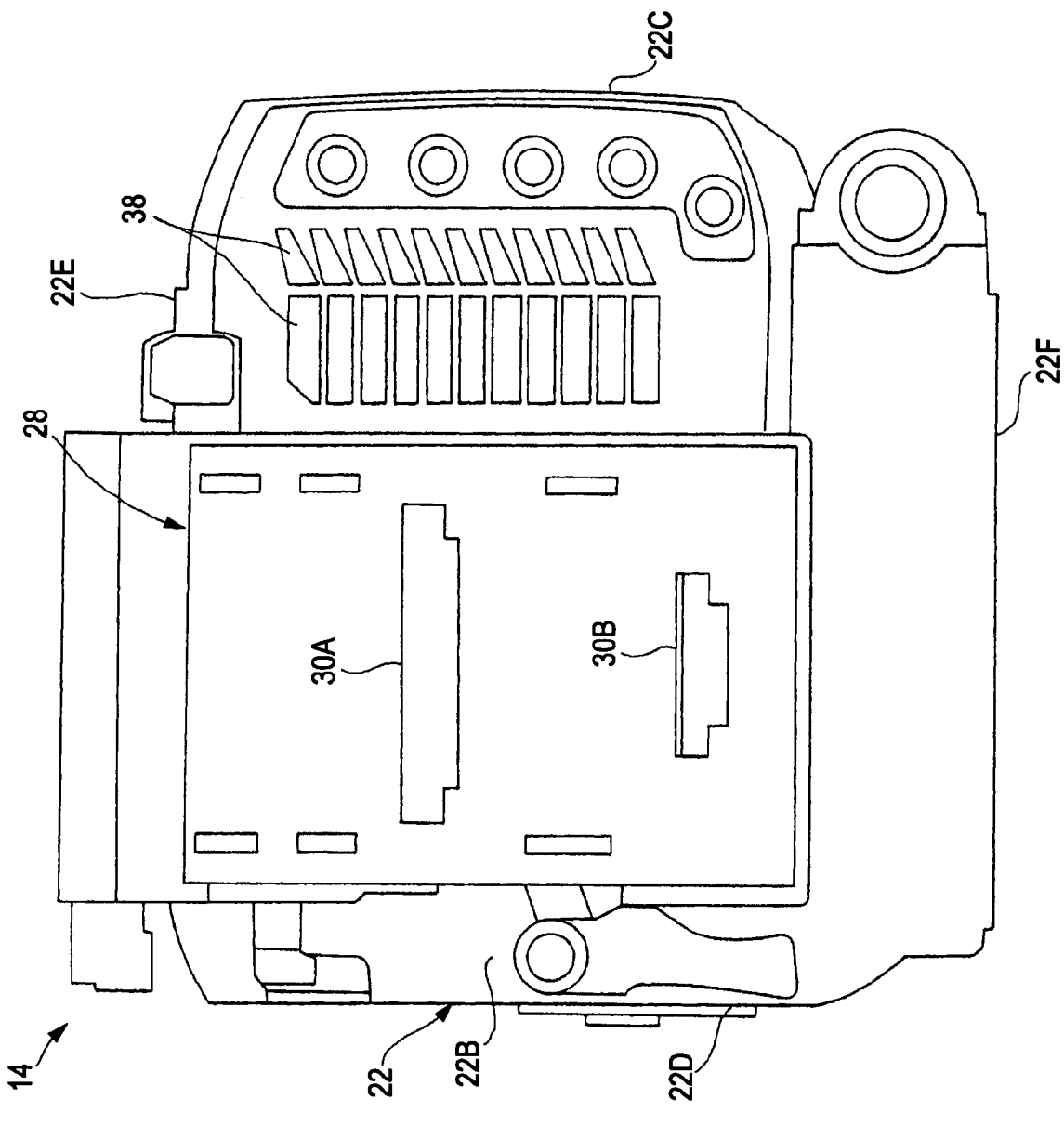
FIG. 6 illustrates the main body as viewed from the direction of arrow VI of FIG. 3.

FIG. 1 is a right side view of an image pickup apparatus 10 in a shooting system according to a first embodiment of the present invention. FIG. 2 is a left side view of the image pickup apparatus 10. FIG. 3 is a left side view of a main body 14 of the image pickup apparatus 10. FIG. 4 illustrates the main body 14 as viewed from the direction of arrow IV of FIG. 3. FIG. 5 illustrates the main body 14 as viewed from the direction of arrow V of FIG. 3. FIG. 6 illustrates the main body 14 as viewed from the direction of arrow VI of FIG. 3.

Figure 7:
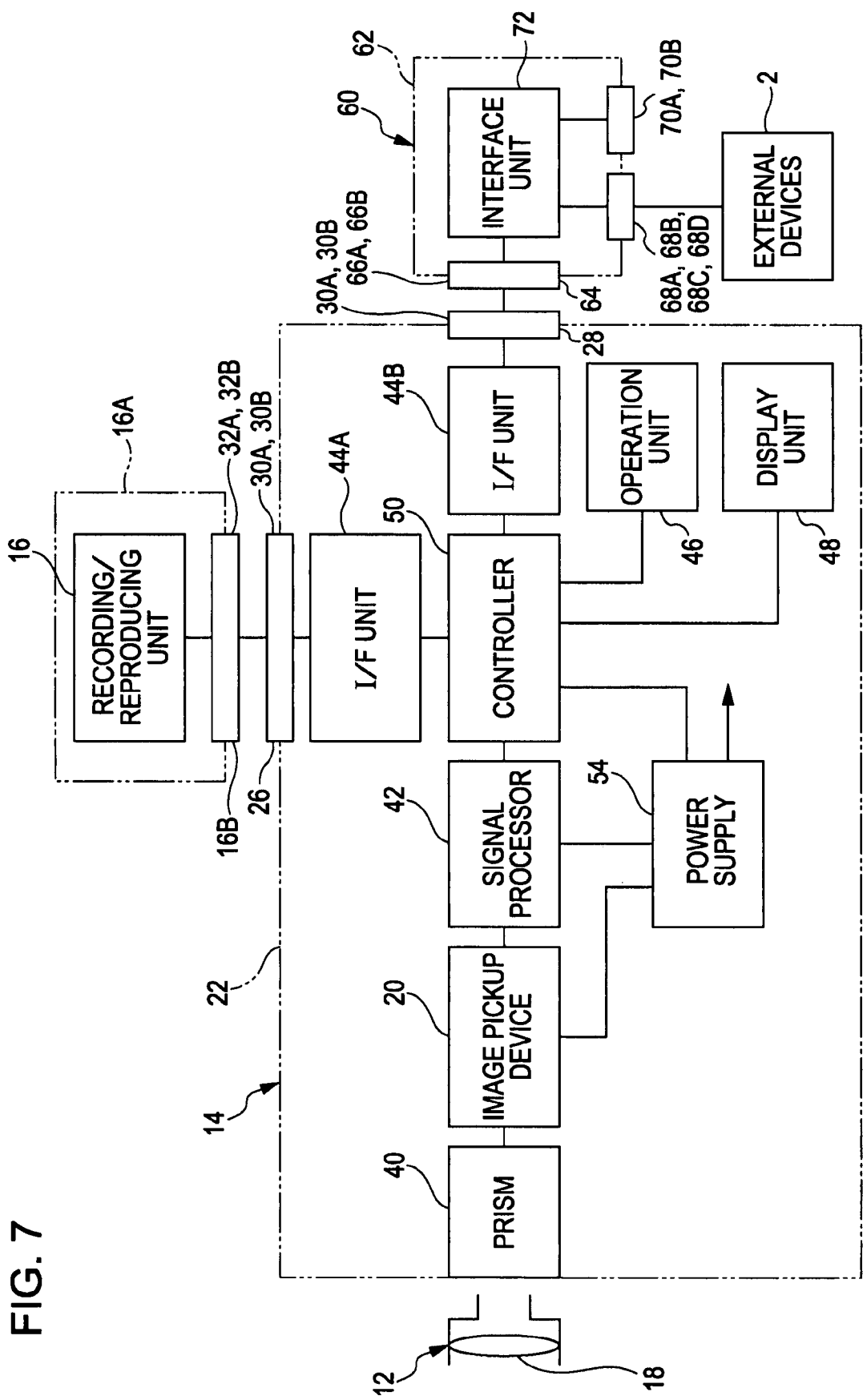
FIG. 7 is a block diagram illustrating a configuration of the shooting system.

FIG. 7 is a block diagram illustrating a configuration of the shooting system.

As illustrated in FIG. 1 and FIG. 2, the shooting system of the present embodiment includes the image pickup apparatus 10 and an interface box 60.

In the present embodiment, the image pickup apparatus 10 is a video camera for movie shooting.

As illustrated in FIG. 1 and FIG. 2, the image pickup apparatus 10 includes a lens barrel 12, the main body 14, and a recording/reproducing unit 16.

In the present specification, "left" and "right" are directions as viewed from the front of the image pickup apparatus 10. In the direction of an optical axis of an optical system, a side adjacent to a subject is referred to as a "front" side, while a side adjacent to an image pickup device 20 is referred to as a "rear" side.

As illustrated in FIG. 7, the lens barrel 12 includes an imaging optical system 18 capable of guiding a subject image to the image pickup device 20. A variety of known image pickup devices, such as a charge-coupled device (CCD) sensor and a complementary metal oxide semiconductor (C-MOS) sensor, may be used as the image pickup device 20.

As illustrated in FIG. 3 through FIG. 6, the main body 14 has a first housing 22 constituting the exterior of the main body 14.

The first housing 22 has a front surface 22A facing forward, a rear surface 22B facing rearward, a left side surface 22C facing leftward, a right side surface 22D facing rightward, an upper surface 22E facing upward, and a lower surface 22F facing downward.

In other words, the first housing 22 has a plurality of outer surfaces of different orientations.

In the present embodiment, the first housing 22 is configured such that a length between the front surface 22A and the rear surface 22B in the front-and-rear direction, a height between the upper surface 22E and the lower surface 22F in the vertical direction, and a width between the left side surface 22C and the right side surface 22D in the horizontal direction are substantially equal. Therefore, the first housing 22 is substantially cubic in shape.

As illustrated in FIG. 5, the front surface 22A of the first housing 22 provides a mount 24 on which the lens barrel 12 is removably mounted.

As illustrated in FIG. 4, the upper surface 22E of the first housing 22 provides a first attachment part 26 to and from which the recording/reproducing unit 16 is attached and detached.

The first attachment part 26 provides two main-body-side connectors 30A and 30B and a connection mechanism (not shown). The main-body-side connector 30A is provided for signal transmission, while the main-body-side connector 30B is for connection to a power source.

As illustrated in FIG. 6, the rear surface 22B of the first housing 22 provides a second attachment part 28 to and from which the recording/reproducing unit 16 is attached and detached.

The second attachment part 28 also provides two main-body-side connectors 30A and 30B and a connection mechanism (not shown). The main-body-side connector 30A is provided for signal transmission, while the main-body-side connector 30B is for connection to a power source.

That is, the two different outer surfaces (upper surface 22E and rear surface 22B) of the first housing 22 provide the first attachment part 26 and the second attachment part 28, respectively, each having the main-body-side connectors 30A and 30B.

Reference numerals 34 and 36 in FIG. 5 and FIG. 4, respectively, denote an air intake. Reference numeral 38 in FIG. 6 denotes an air vent.

As illustrated in FIG. 1 and FIG. 2, the recording/reproducing unit 16 has a second housing 16A constituting the exterior of the recording/reproducing unit 16.

The second housing 16A provides a recording/reproducing-unit-side attachment part 16B attachable to both the first attachment part 26 and the second attachment part 28.

As illustrated in FIG. 7, the recording/reproducing-unit-side attachment part 16B provides recording/reproducing-unit-side connectors 32A and 32B attachable to and detachable from the main-body-side connectors 30A and 30B, respectively.

By operating an operation member provided in the connection mechanism, the recording/reproducing-unit-side attachment part 16B is attached to or detached from the first attachment part 26 or the second attachment part 28. This allows the recording/reproducing-unit-side connectors 32A and 32B to be electrically connected to or disconnected from the main-body-side connectors 30A and 30B, respectively.

A variety of known structures can be used as the connection mechanism described above.

The recording/reproducing unit 16 includes a recording/reproducing mechanism configured to record picture data to be recorded supplied from the main body 14 through the main-body-side connector 30A and recording/reproducing-unit-side connector 32A in a recording medium, and to supply picture data reproduced from the recording medium through the recording/reproducing-unit-side connector 32A and main-body-side connector 30A to the main body 14.

The recording/reproducing unit 16 is configured to record audio data to be recorded supplied from the main body 14 through the main-body-side connector 30A and recording/reproducing-unit-side connector 32A in a recording medium, and to supply audio data reproduced from the recording medium through the recording/reproducing-unit-side connector 32A and main-body-side connector 30A to the main body 14.

A variety of known recording media, such as a magnetic recording tape, optical disk, and hard disk, can be used as the recording medium.

The recording/reproducing unit 16 operates on power supplied from the main body 14 through the main-body-side connector 30B and recording/reproducing-unit-side connector 32B.

As illustrated in FIG. 3, a plurality of connectors 23 for connection to external devices are arranged in a lower part of the left side surface 22C and in the front-and-rear direction of the main body 14.

With this configuration, the recording/reproducing unit 16 can be selectively attached to either the upper surface 22E or rear surface 22B of the main body 14. Therefore, when the image pickup apparatus 10 is used as a camera for movie shooting, it is easy to choose a shooting angle similar to that of a known film camera. Moreover, since the image pickup apparatus 10 can be easily attached to a shooting assist device designed for known film cameras, it is advantageous in enhancing usability in an environment where known film cameras are used.

Figure 8:
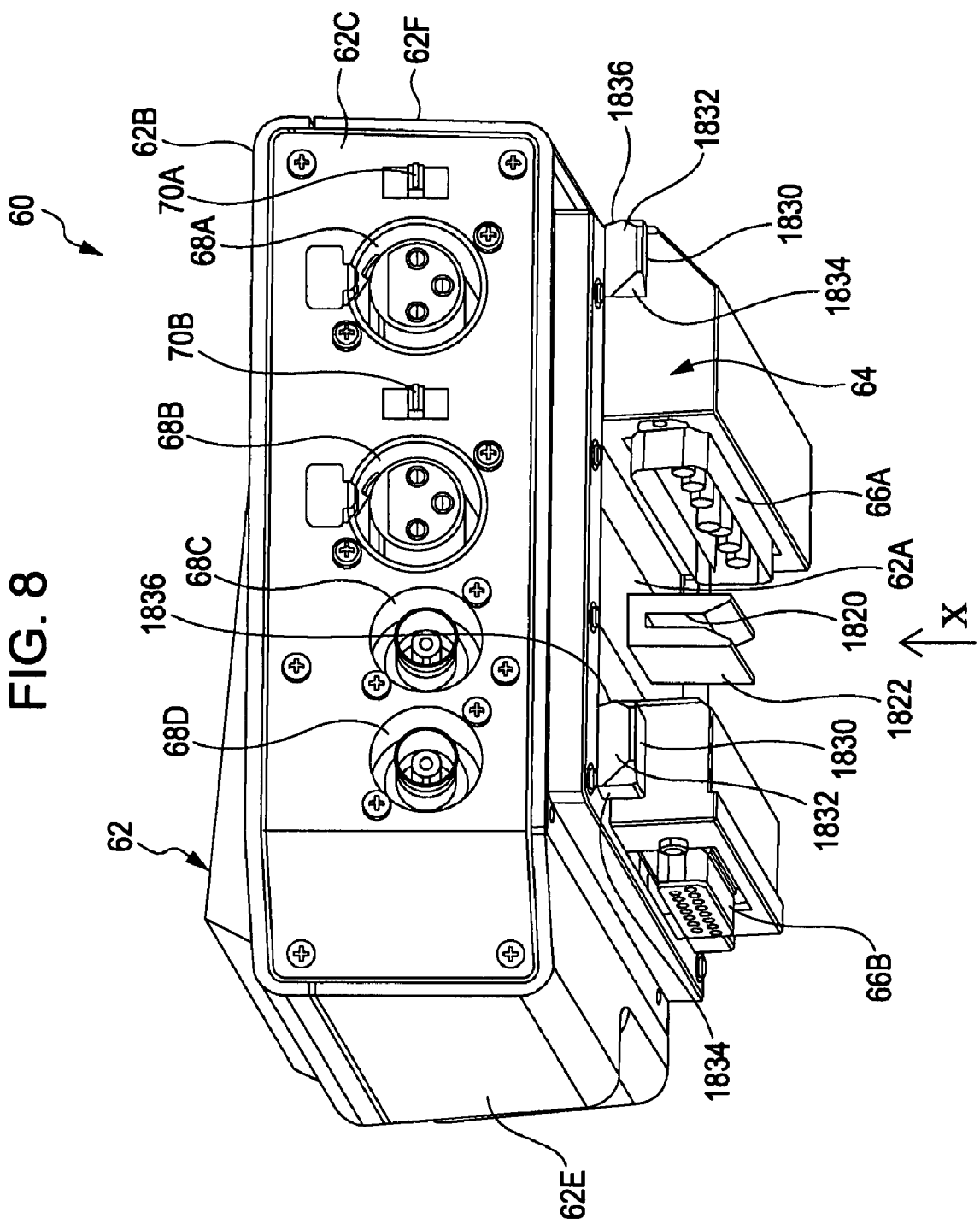
FIG. 8 is a perspective view of an interface box.
Figure 9:
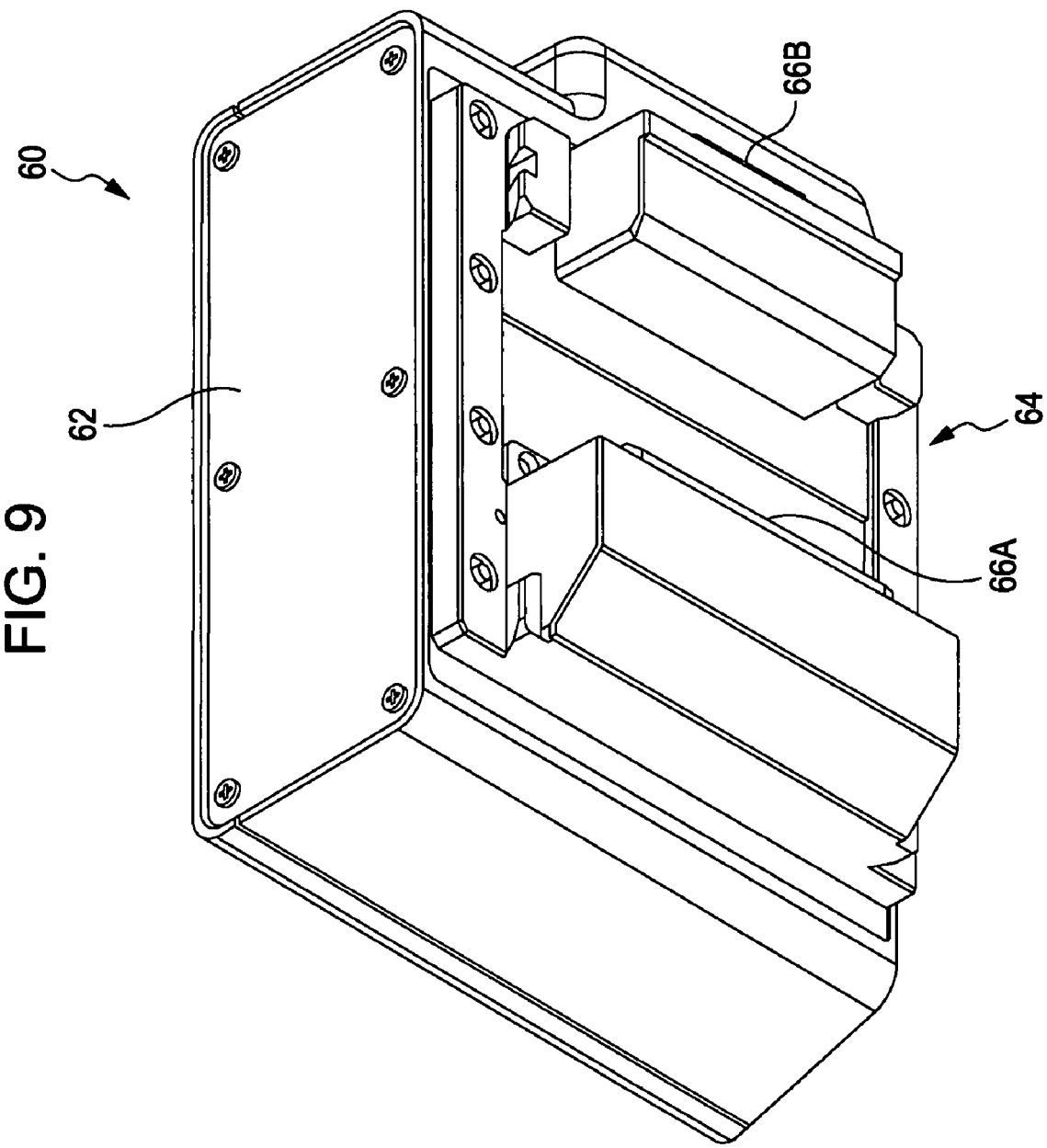
FIG. 9 is another perspective view of the interface box.
Figure 10:
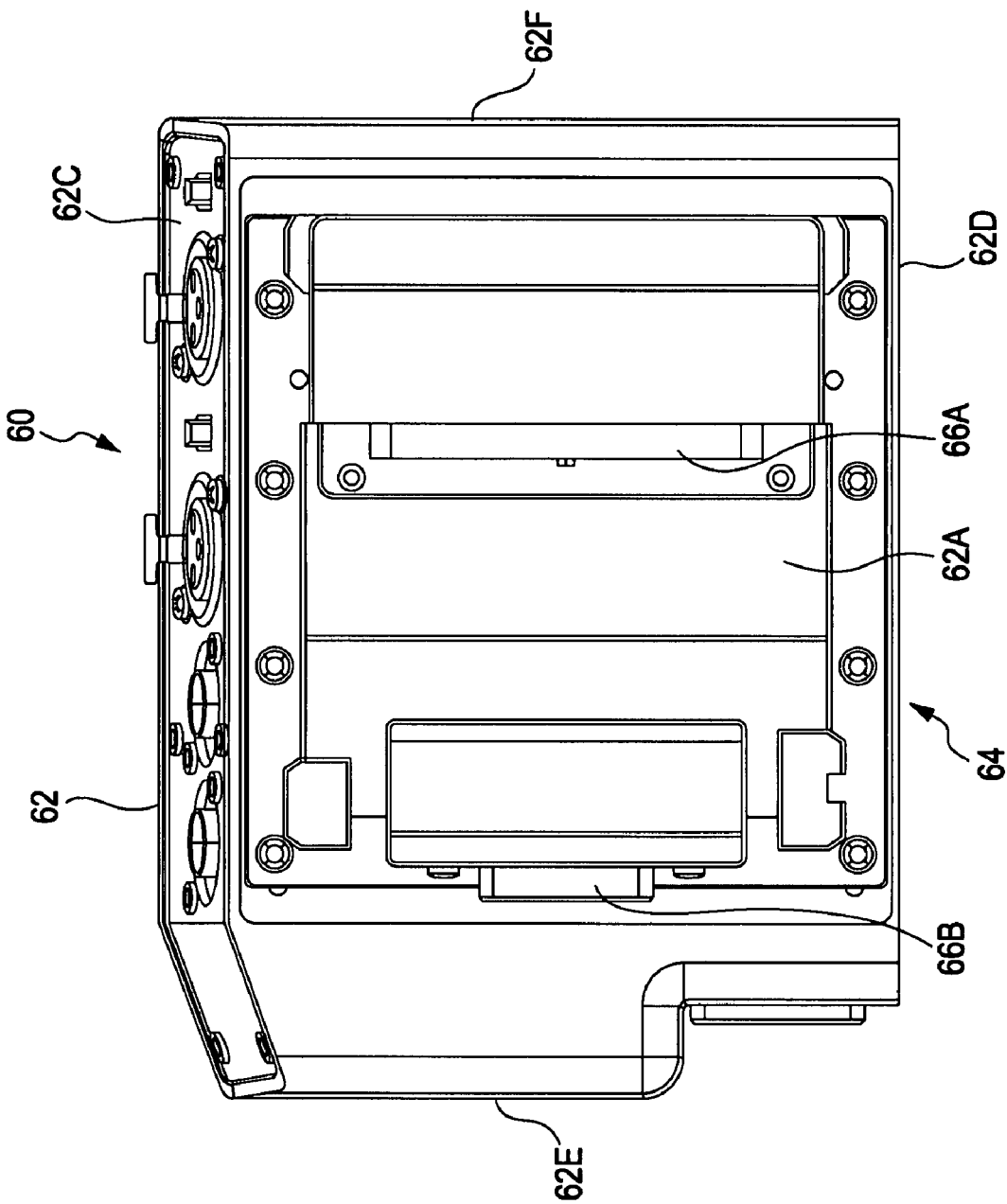
FIG. 10 illustrates the interface box as viewed from the direction of arrow X of FIG. 8.
Figure 11:
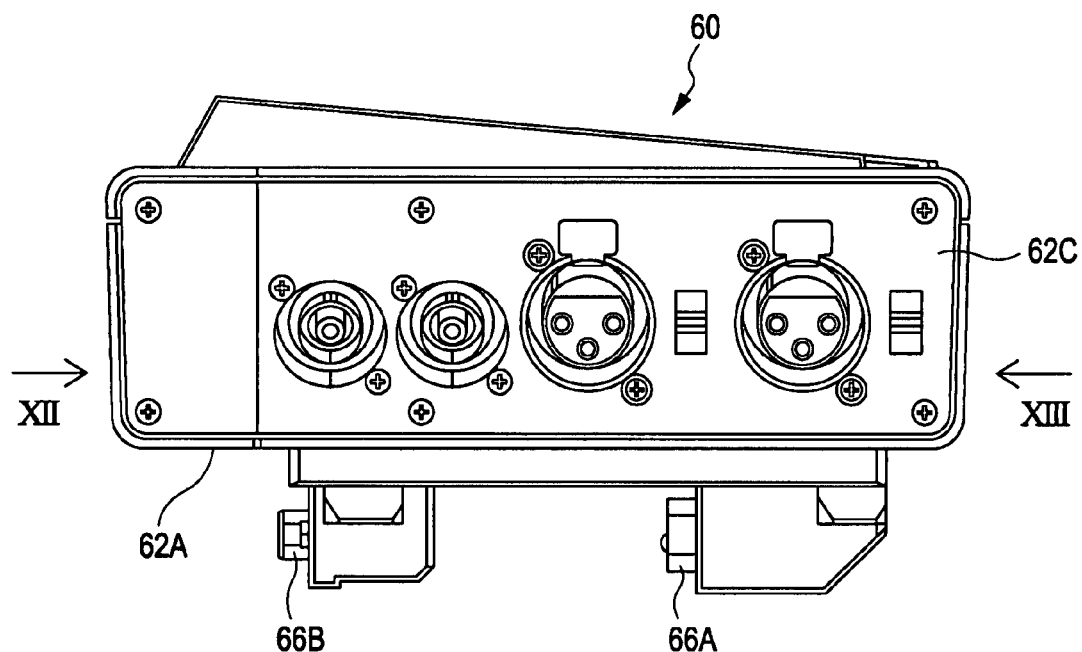
FIG. 11 is a front view of the interface box.
Figure 12:
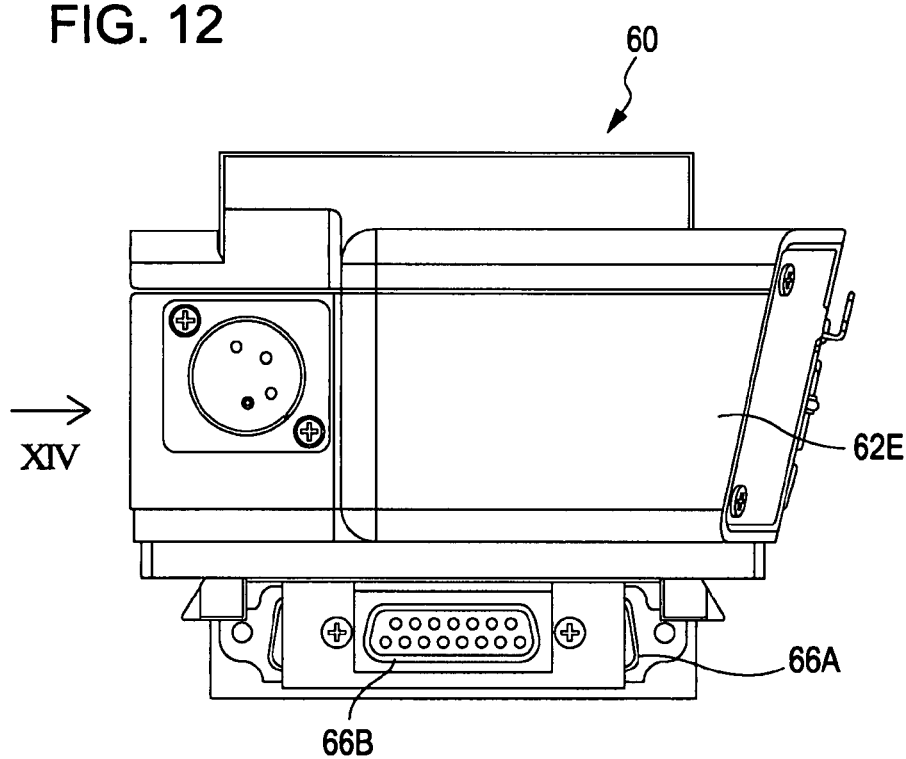
FIG. 12 illustrates the interface box as viewed from the direction of arrow XII of FIG. 11.
Figure 13:
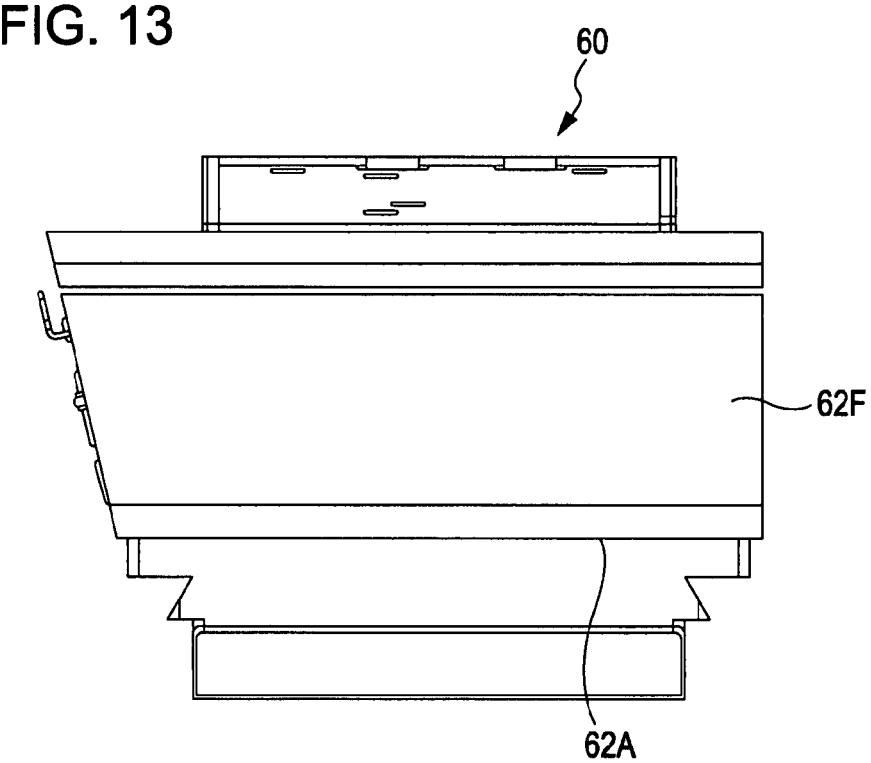
FIG. 13 illustrates the interface box as viewed from the direction of arrow XIII of FIG. 11.
Figure 14:
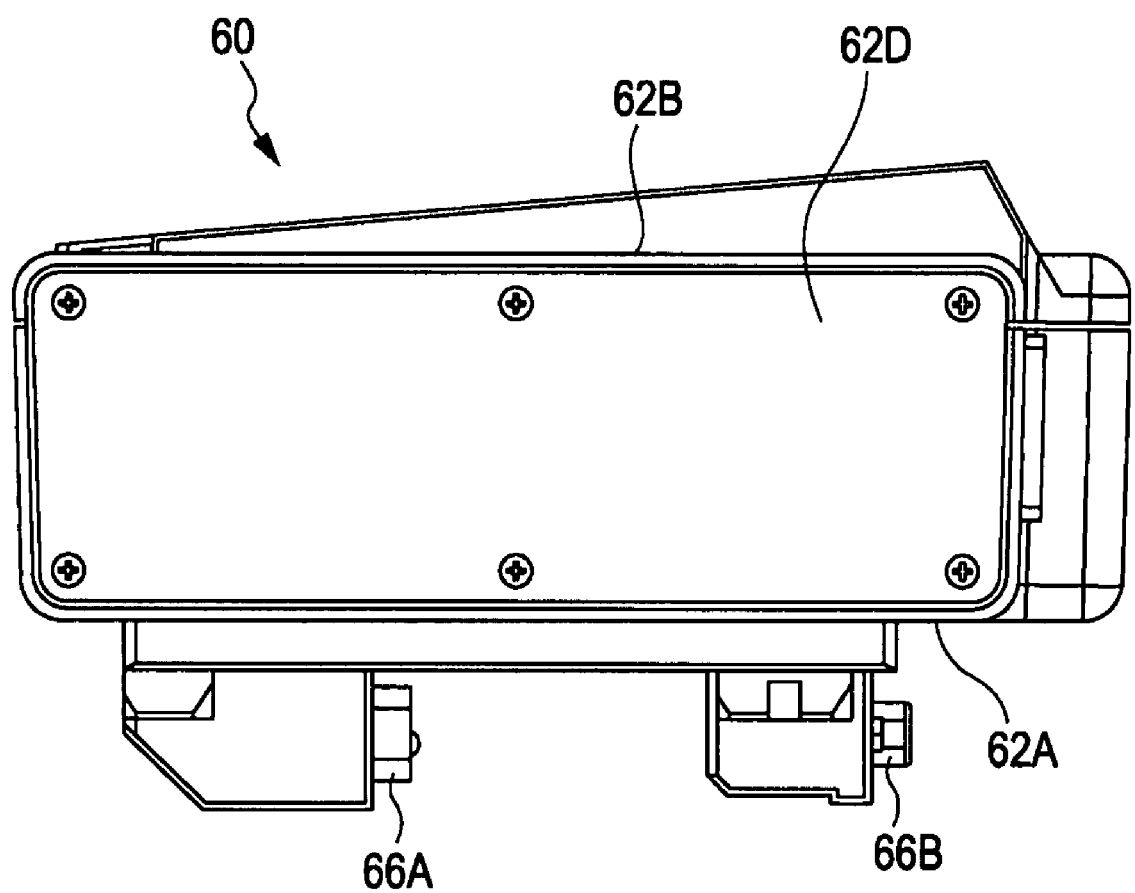
FIG. 14 illustrates the interface box viewed from the direction of arrow XIV of FIG. 12.

FIG. 8 and FIG. 9 are perspective views of the interface box 60. FIG. 10 illustrates the interface box 60 as viewed from the direction of arrow X of FIG. 8. FIG. 11 is a front view of the interface box 60. FIG. 12 illustrates the interface box 60 as viewed from the direction of arrow XII of FIG. 11. FIG. 13 illustrates the interface box as viewed from the direction of arrow XIII of FIG. 11. FIG. 14 illustrates the interface box 60 as viewed from the direction of arrow XIV of FIG. 12.

As illustrated in FIG. 7 through FIG. 13, the interface box 60 has a third housing 62 constituting the exterior of the interface box 60. The third housing 62 includes an interface unit 72 (see FIG. 7) described below.

As illustrated in FIG. 8 and FIG. 10, the third housing 62 has a bottom surface 62A substantially rectangular in shape, a plate-like upper surface 62B having substantially the same shape as that of the bottom surface 62A and facing the bottom surface 62A with a space therebetween, side surfaces 62C and 62D each connecting two long sides of the bottom surface 62A and upper surface 62B, and side surfaces 62E and 62F each connecting two short sides of the bottom surface 62A and upper surface 62B.

As illustrated in FIG. 8, the bottom surface 62A provides an interface-box-side attachment part 64 attachable to both the first attachment part 26 and the second attachment part 28, and a block 1822 having an engagement groove 1820 and provided for movement of the interface box 60.

The interface-box-side attachment part 64 provides interface-box-side connectors 66A and 66B attachable to and detachable from the main-body-side connectors 30A and 30B, respectively.

By operating the operation member in the connection mechanism provided in the first attachment part 26 or the second attachment part 28, the interface-box-side attachment part 64 is attached to or detached from the first attachment part 26 or the second attachment part 28. This allows the interface-box-side connectors 66A and 66B to be electrically connected to or disconnected from the main-body-side connectors 30A and 30B, respectively.

That is, by attaching the interface-box-side attachment part 64 of the interface box 60 to the first attachment part 26 of the main body 14 as illustrated in FIG. 2, the interface box 60 is attached to the upper surface 22E of the main body 14.

Also, by attaching the interface-box-side attachment part 64 of the interface box 60 to the second attachment part 28 of the main body 14 as illustrated in FIG. 1, the interface box 60 is attached to the rear surface 22B of the main body 14.

As illustrated in FIG. 8, the side surface 62C provides four connectors, a first audio signal input connector 68A, a second audio signal input connector 68B, a first digital picture signal output terminal 68C, and a second digital picture signal output terminal 68D.

In the present embodiment, the first and second audio signal input connectors 68A and 68B and the first and second digital picture signal output terminals 68C and 68D serve as connectors for connection to external devices.

The side surface 62C also provides a first input signal selector switch 70A and a second input signal selector switch 70B near the first and second audio signal input connectors 68A and 68B.

Next, a configuration of the main body 14 and interface box 60 will be described in detail with reference to FIG. 7.

As illustrated in FIG. 7, in addition to the image pickup device 20 described above, the main body 14 includes a prism 40, a signal processor 42, an interface (I/F) unit 44A, an I/F unit 44B, an operation unit 46, a display unit 48, a controller 50, and a power supply 54.

In the present embodiment, the main body 14 includes three image pickup devices 20 corresponding to three colors (red, green, and blue). The prism 40 divides a beam forming a subject image guided from the imaging optical system 18 into the three colors (red, green, and blue) and guides them to their corresponding image pickup devices 20.

The signal processor 42 drives each image pickup device 20 and performs a series of preprocessing steps on a picture signal supplied from each image pickup device 20. For example, the signal processor 42 performs correlated double sampling (CDS) to maintain a good signal to noise (S/N) ratio, performs automatic gain control (AGC) to control gain, and further performs analog/digital (A/D) conversion to generate picture data, which is a digital signal. Additionally, the signal processor 42 compresses (encodes) the preprocessed picture data in a predetermined compression format to generate picture data to be recorded. The generated picture data to be recorded is supplied through the controller 50 and I/F units 44A and 44B to the recording/reproducing unit 16.

Also, the signal processor 42 supplies the preprocessed picture signal through one of the connectors 23 (see FIG. 3) to an external display device so as to display a picture during shooting on the display device. Alternatively, the signal processor 42 expands (decodes) picture data reproduced by the recording/reproducing unit 16 and supplied thereto through the controller 50 and I/F units 44A and 44B, and supplies the expanded picture data to be played back through one of the connectors 23 to an external display device so as to display a playback picture on the display device.

The I/F units 44A and 44B perform transmission and reception of picture signals and control signals associated with the transmission and reception of the picture signals between the controller 50 and the recording/reproducing unit 16.

The I/F units 44A and 44B also perform transmission and reception of signals between the controller 50 and the interface box 60.

The operation unit 46 includes switches and volume controls used to set various settings for operation of the image pickup apparatus 10.

The display unit 48 includes a display and a light-emitting diode (LED) lamp for displaying an operating state of the image pickup apparatus 10.

The controller 50 has control over the signal processor 42, I/F units 44A and 44B, operation unit 46, and display unit 48 described above.

More specifically, the controller 50 is a microcomputer including a central processing unit (CPU), random-access memory (RAM) providing a working area, read-only memory (ROM) storing a control program and the like, a peripheral large-scale integrated circuit (LSI) for transmission and reception of control signals and data signals to and from the signal processor 42, I/F units 44A and 44B, operation unit 46, and display unit 48. Various control operations are performed when the CPU executes the control program stored in the ROM.

The power supply 54 supplies power generated on the basis of power supplied from an external power source (not shown) through one of the connectors 23, to the image pickup devices 20, signal processor 42, I/F units 44A and 44B, operation unit 46, and display unit 48. Thus, the power supply 54 allows each of them to operate.

The interface unit 72 of the interface box 60 transmits and receives signals to and from the controller 50 and signal processor 42 through the I/F units 44A and 44B. At the same time, the interface unit 72 transmits and receives signals to and from external devices 2 through the first and second audio signal input connectors 68A and 68B and first and second digital picture signal output terminals 68C and 68D.

The first and second audio signal input connectors 68A and 68B are connected to the external devices 2 including external microphones and an electronic device for audio output. Thus, an audio signal (audio data) from the microphones or electronic device is input to the interface unit 72.

That is, the interface unit 72 supplies the input audio signal to the controller 50 and signal processor 42 through one of the I/F units 44A and 44B. The controller 50 and signal processor 42 supplies the supplied audio signal to the recording/reproducing unit 16 through the other of the I/F units 44A and 44B.

Thus, the audio signal supplied through the interface unit 72 is recorded by the recording/reproducing unit 16 in a recording medium.

In the present embodiment, the interface unit 72 is configured to be connectable to three types of external devices 2, that is, a microphone requiring power supply, a microphone not requiring power supply, and an electronic device supplying audio signals through line output. In response to three-position switching operations of the first and second input signal selector switches 70A and 70B, the interface unit 72 turns on and off signal processing and power supply for the three types of external devices 2.

The first and second digital picture signal output terminals 68C and 68D are connected to the external devices 2 including an external monitor device (display) and an external recording/reproducing device. This allows digital picture signals to be supplied to the monitor device and recording/reproducing device.

In the present embodiment, the digital picture signals are picture signals of high-definition standards.

That is, the interface unit 72 receives picture signals supplied from the signal processor 42 or the controller 50 through one of the I/F units 44A and 44B and supplies the received picture signals through the first and second digital picture signal output terminals 68C and 68D to the monitor device and recording/reproducing device.

Thus, a picture based on the digital picture signals output through the interface unit 72 is displayed on the monitor device (external device 2), or the digital picture signals output through the interface unit 72 is recorded by the external recording/reproducing device (external device 2) in a recording medium.

In the present embodiment, the recording/reproducing unit 16 is attached to one of the first and second attachment parts 26 and 28 of the main body 14, while the interface box 60 is attached to the other of the first and second attachment parts 26 and 28. In this case, the main-body-side connectors 30A and 30B provided in one of the first and second attachment parts 26 and 28 are connected to the recording/reproducing-unit-side connectors 32A and 32B, respectively, while the main-body-side connectors 30A and 30B provided in the other of the first and second attachment parts 26 and 28 are connected to the interface-box-side connectors 66A and 66B, respectively.

Therefore, since none of the main-body-side connectors 30A and 30B in the first and second attachment parts 26 and 28 are exposed outward, it is possible to prevent adherence of dust. That is, without providing a cover for covering the main-body-side connectors 30A and 30B which are not currently being used, adherence of dust to the main-body-side connectors 30A and 30B can be prevented.

Moreover, the interface box 60 covering (or connected to) the main-body-side connectors 30A and 30B performs transmission and reception of signals between the main body 14 and the external devices 2, and thus allows use of functions of the main-body-side connectors 30A and 30B to which the recording/reproducing unit 16 is not connected. This is advantageous in enhancing the added value of the shooting system.

Additionally, in the present embodiment, since the interface box 60 performs transmission and reception of signals between the main body 14 and the external devices 2, it is very easy to record audio signals by using the recording/reproducing unit 16 and to supply digital picture signals to the external devices 2. This is also advantageous in enhancing the added value of the shooting system.

With the interface box 60 of the present embodiment, it is possible to prevent dust from adhering to the main-body-side connectors 30A and 30B without providing a cover for covering the main-body-side connectors 30A and 30B which are not currently being used. At the same time, the interface box 60 can perform transmission and reception of signals between the main body 14 and the external devices 2. This is advantageous in enhancing the added value of the shooting system.

Also, since signals can be transmitted and received between the main body 14 and the external devices 2, it is very easy to record audio signals by using the recording/reproducing unit 16 and to supply digital picture signals to the external devices 2. This is advantageous in enhancing the added value of the shooting system.

Second Embodiment

The first embodiment describes the case where external devices connected to the interface box 60 include microphones, electronic device, monitor device, and recording/reproducing device. However, external devices connected to the interface box 60 are not limited to them.

Figure 15:
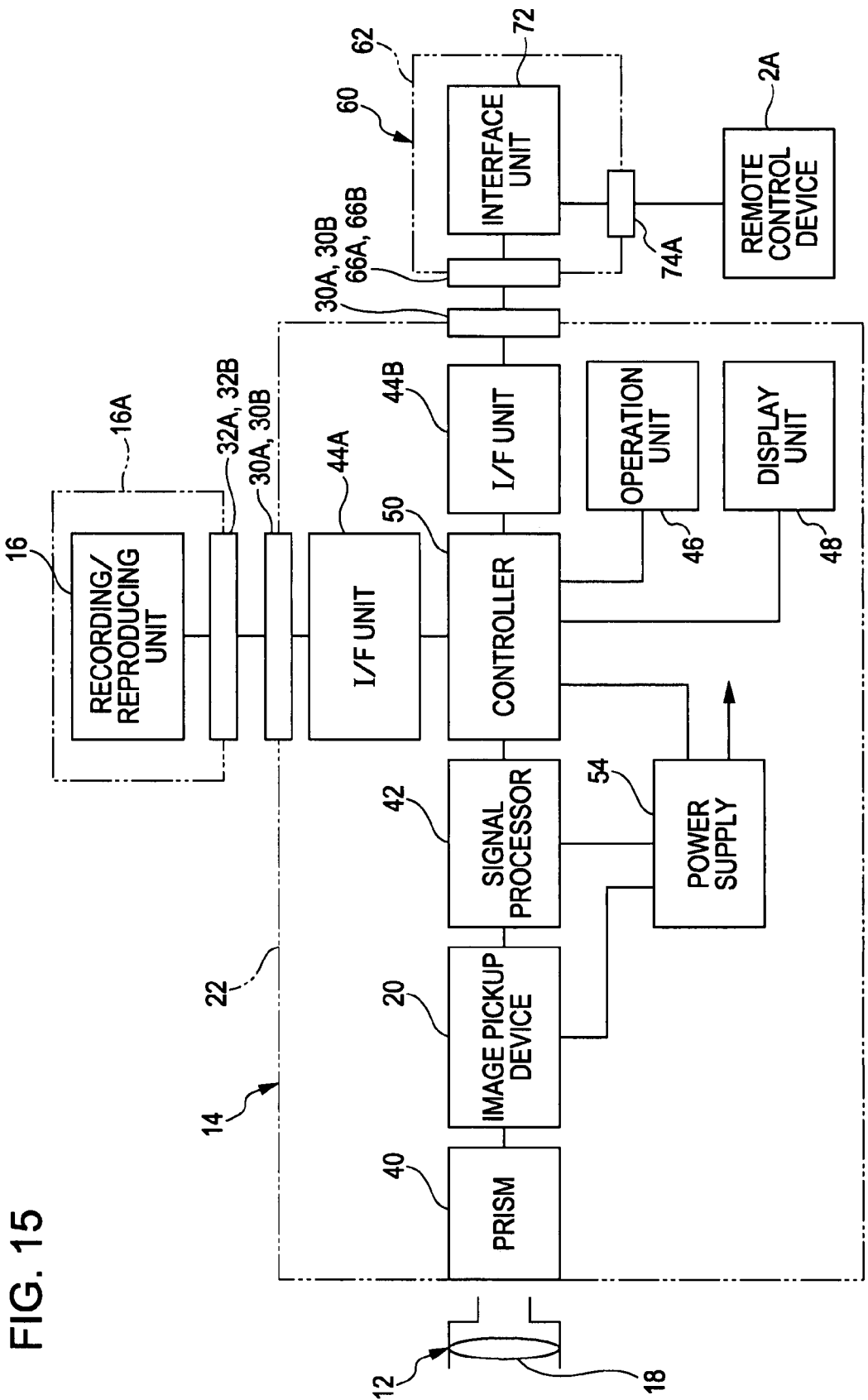
FIG. 15 is a block diagram illustrating a shooting system according to a second embodiment of the present invention.

FIG. 15 is a block diagram illustrating a shooting system according to a second embodiment of the present invention. In the following embodiments, parts and components that are identical to those in the first embodiment are given the same reference numerals, and their detailed descriptions are omitted.

In the second embodiment, the external devices 2 of the first embodiment are replaced with a remote control device 2A.

In this case, the interface box 60 (third housing 62) provides a remote control connector 74A (external device connector) to which the remote control device 2A is connected via a cable. The interface unit 72 performs transmission and reception of remote control signals between the controller 50 and the remote control device 2A.

As is the case with the first embodiment, this configuration makes it possible to prevent dust from adhering to the main-body-side connectors 30A and 30B and allow use of functions of the main-body-side connectors 30A and 30B to which the recording/reproducing unit 16 is not connected. Again, this is advantageous in enhancing the added value of the shooting system. Additionally, in the second embodiment, since the remote control device 2A makes it possible to remote-control the main body 14 at a location distant from the shooting system, it is easy to realize a shooting environment where the operator is not present near the shooting system. This is advantageous in improving the usability of the shooting system.

Third Embodiment

A third embodiment of the present invention will now be described.

Figure 16:
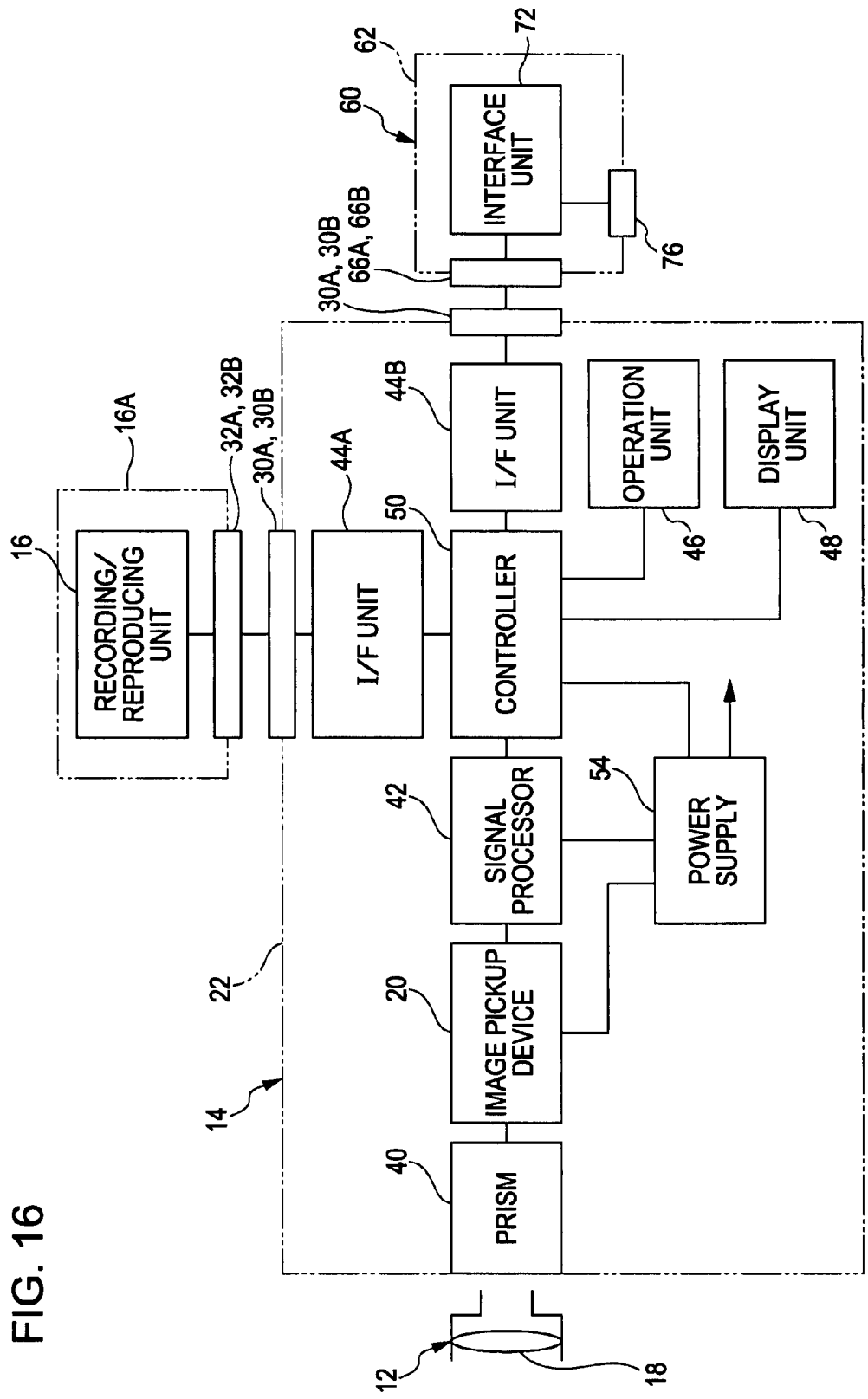
FIG. 16 is a block diagram illustrating a shooting system according to a third embodiment of the present invention.

FIG. 16 is a block diagram illustrating a shooting system of the third embodiment.

In the third embodiment, the interface box 60 (third housing 62) provides an operation switch 76. In response to an operation of the operation switch 76 detected through the interface unit 72, the controller 50 controls the recording/reproducing mechanism, signal processor 42, and the like.

With this configuration, the third embodiment can achieve similar effects to those of the first embodiment. Moreover, in the third embodiment, use of the operation switch 76 allows additional control which is not achievable by using the operation switch provided in the main body 14. This is advantageous in improving user convenience.

Fourth Embodiment

A fourth embodiment of the present invention will now be described.

Figure 17:
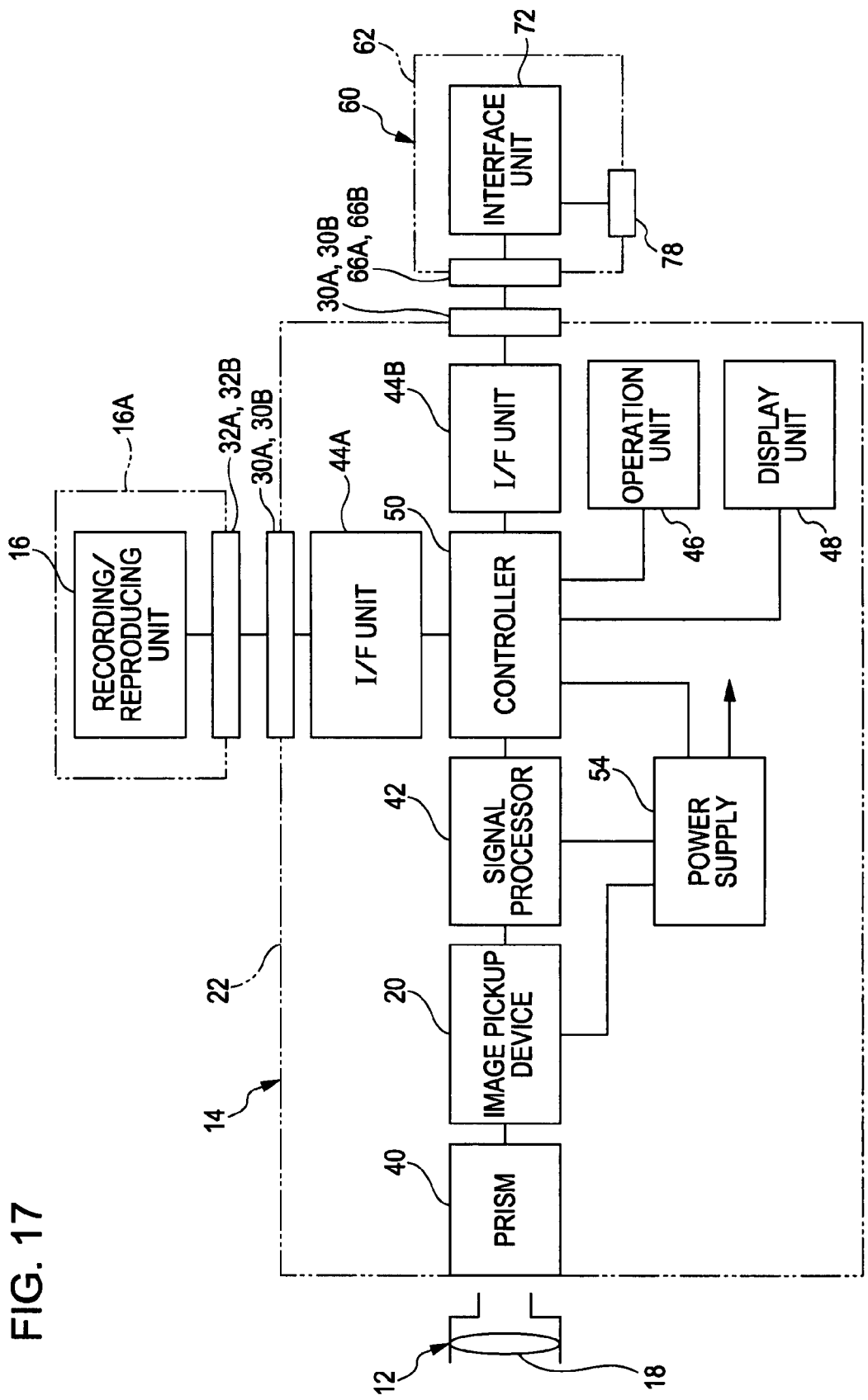
FIG. 17 is a block diagram illustrating a shooting system according to a fourth embodiment of the present invention.

FIG. 17 is a block diagram illustrating a shooting system of the fourth embodiment.

In the fourth embodiment, the interface box 60 (third housing 62) provides a display unit 78 including a display lamp, a display device for displaying text and graphics, and the like. Then, according to the operation of the recording/reproducing mechanism, signal processor 42, and the like, the controller 50 controls the display operation of the display unit 78 through the interface unit 72.

With this configuration, the fourth embodiment can achieve similar effects to those of the first embodiment. Moreover, the fourth embodiment makes it possible to provide the user with information about the operation of the recording/reproducing mechanism, signal processor 42, and the like through display on the display unit 78. This is advantageous in improving user convenience.

Fifth Embodiment

A fifth embodiment of the present invention will now be described.

Figure 18:
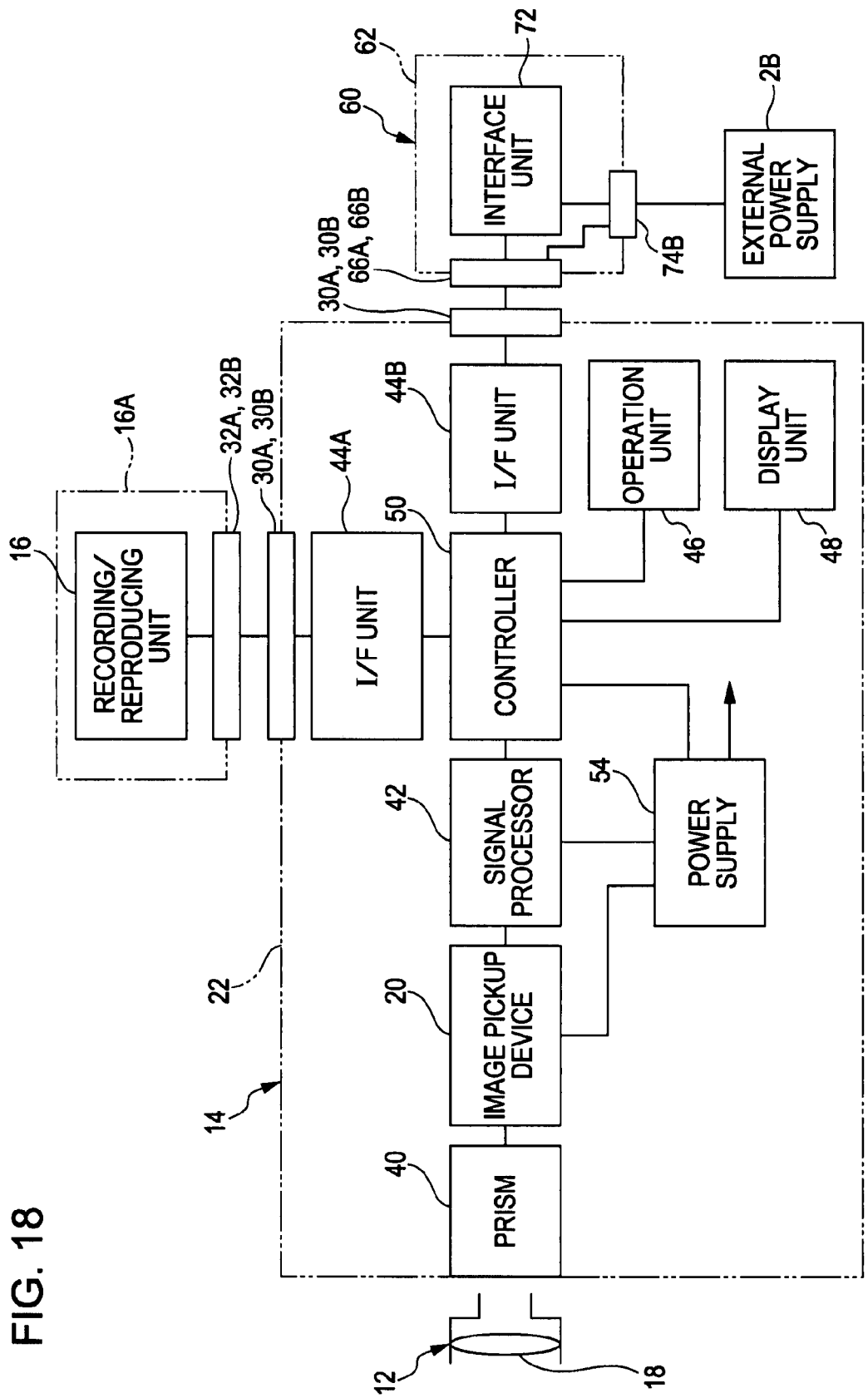
FIG. 18 is a block diagram illustrating a shooting system according to a fifth embodiment of the present invention.

FIG. 18 is a block diagram illustrating a shooting system of the fifth embodiment.

In the fifth embodiment, an external power supply 2B is connected to the interface box 60.

More specifically, the interface box 60 (third housing 62) provides an external power input connector 74B (external device connector) to which the external power supply 2B is connected via a cable. Then, external power supplied from the external power supply 2B to the external power input connector 74B is supplied to the power supply 54 (i.e., to the main body 14) through the external power input connector 74B, interface-box-side connector 66B, and main-body-side connector 30B.

For supplying the external power, there may be provided, between the interface-box-side connector 66B and the mainbody-side connector 30B, an additional circuit for conversion of voltage or current of external power supplied from the external power supply 2B. Such an additional circuit may be included in the interface unit 72.

With this configuration, the fifth embodiment can achieve similar effects to those of the first embodiment. Moreover, the fifth embodiment allows transmission and reception of power between the main body 14 and the external power supply 2B. This is advantageous in enhancing the added value of the shooting system.

Additionally, since power can be supplied from the external power supply 2B using the external power input connector 74B located in a different place from the connectors 23 (FIG. 3) provided in the main body 14, it is possible to ensure freedom of cable wiring of the external power supply 2B. This is advantageous in improving the usability of the shooting system.

Sixth Embodiment

A sixth embodiment of the present invention will now be described.

Figure 19:
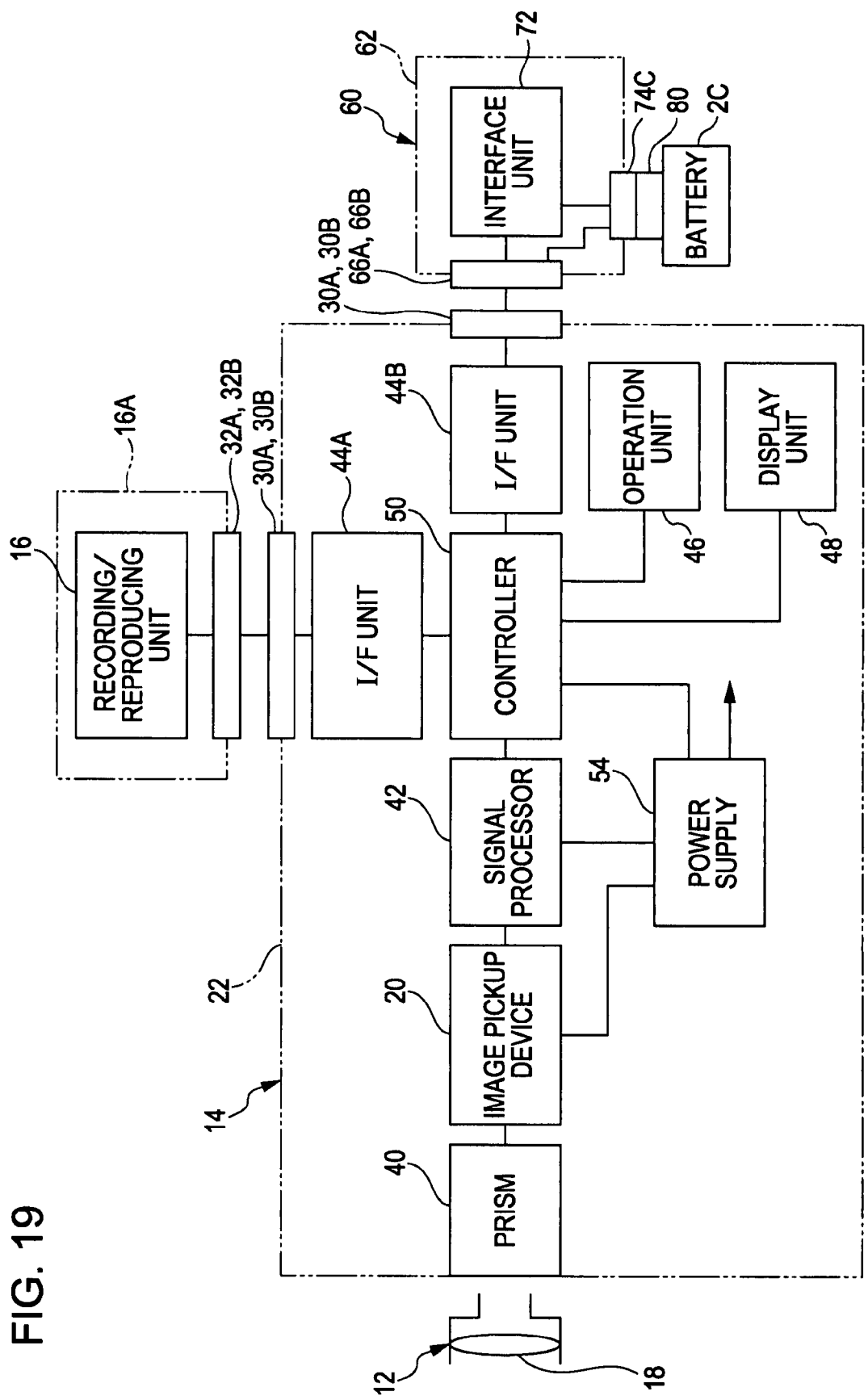
FIG. 19 is a block diagram illustrating a shooting system according to a sixth embodiment of the present invention.

FIG. 19 is a block diagram illustrating a shooting system of the sixth embodiment.

In the sixth embodiment, the interface box 60 provides a battery attachment part 80 to and from which a battery 2C (external device) can be attached and detached and a battery connector 74C (external device connector) connected to an electrode of the battery 2C.

Then, power supplied from the battery 2C attached to the battery attachment part 80 is supplied to the power supply 54 (i.e., to the main body 14) through the battery connector 74C, interface-box-side connector 66B, and main-body-side connector 30B.

For supplying power from the battery 2C, there may be provided, between the interface-box-side connector 66B and the main-body-side connector 30B, an additional circuit for conversion of voltage or current of external power supplied from the battery 2C, and a communication circuit for communication with a communication unit provided in the battery 2C. Such an additional circuit and a communication unit may be included in the interface unit 72.

With this configuration, the sixth embodiment can achieve similar effects to those of the first embodiment. Moreover, the sixth embodiment allows transmission and reception of power between the main body 14 and the battery 2C. This is advantageous in enhancing the added value of the shooting system.

Additionally, power can be supplied from the battery 2C to the main body 14 without using a cable. This is advantageous in enhancing the usability of the shooting system.

(Detailed Description of Attachment Part)

Next, an attachment part 122 will be described in detail as an example of the first attachment part 26 or the second attachment part 28. The recording/reproducing unit 16 and interface box 60 described above are examples of an ancillary device.

Figure 20:
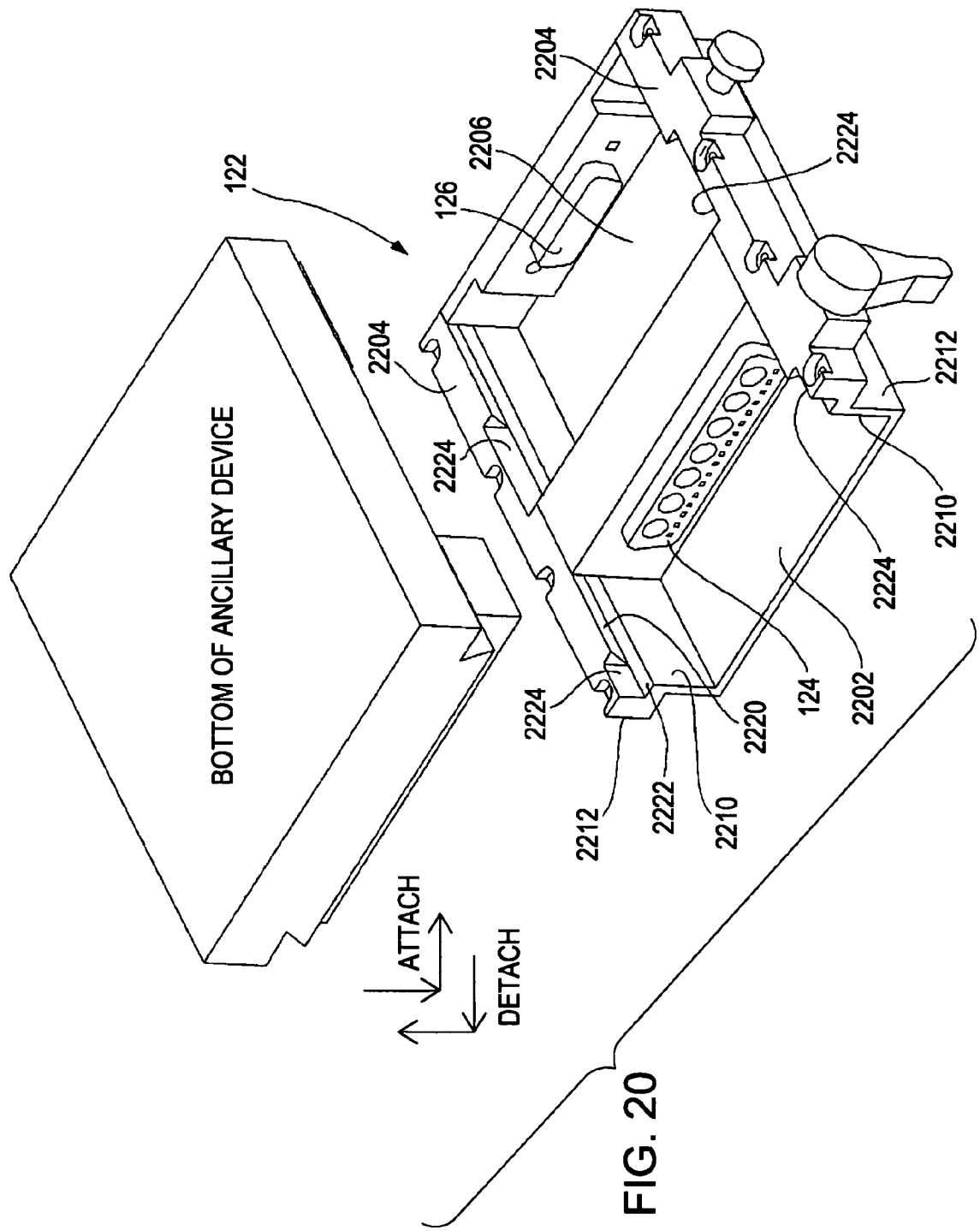
FIG. 20 illustrates attachment and detachment of an ancillary device to and from an attachment part.
Figure 21:
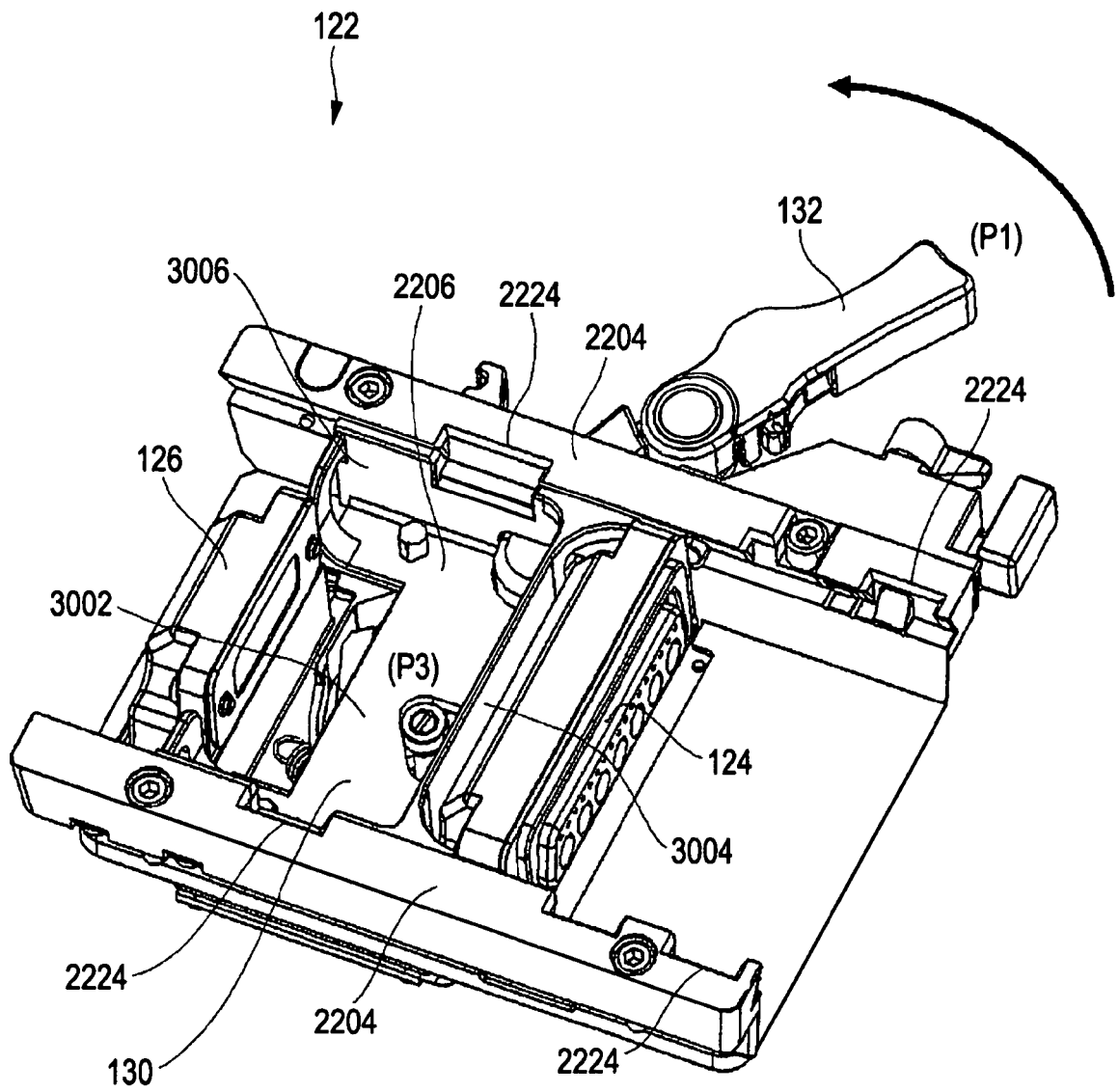
FIG. 21 illustrates the operation of a control lever and an ancillary device slider.
Figure 22:
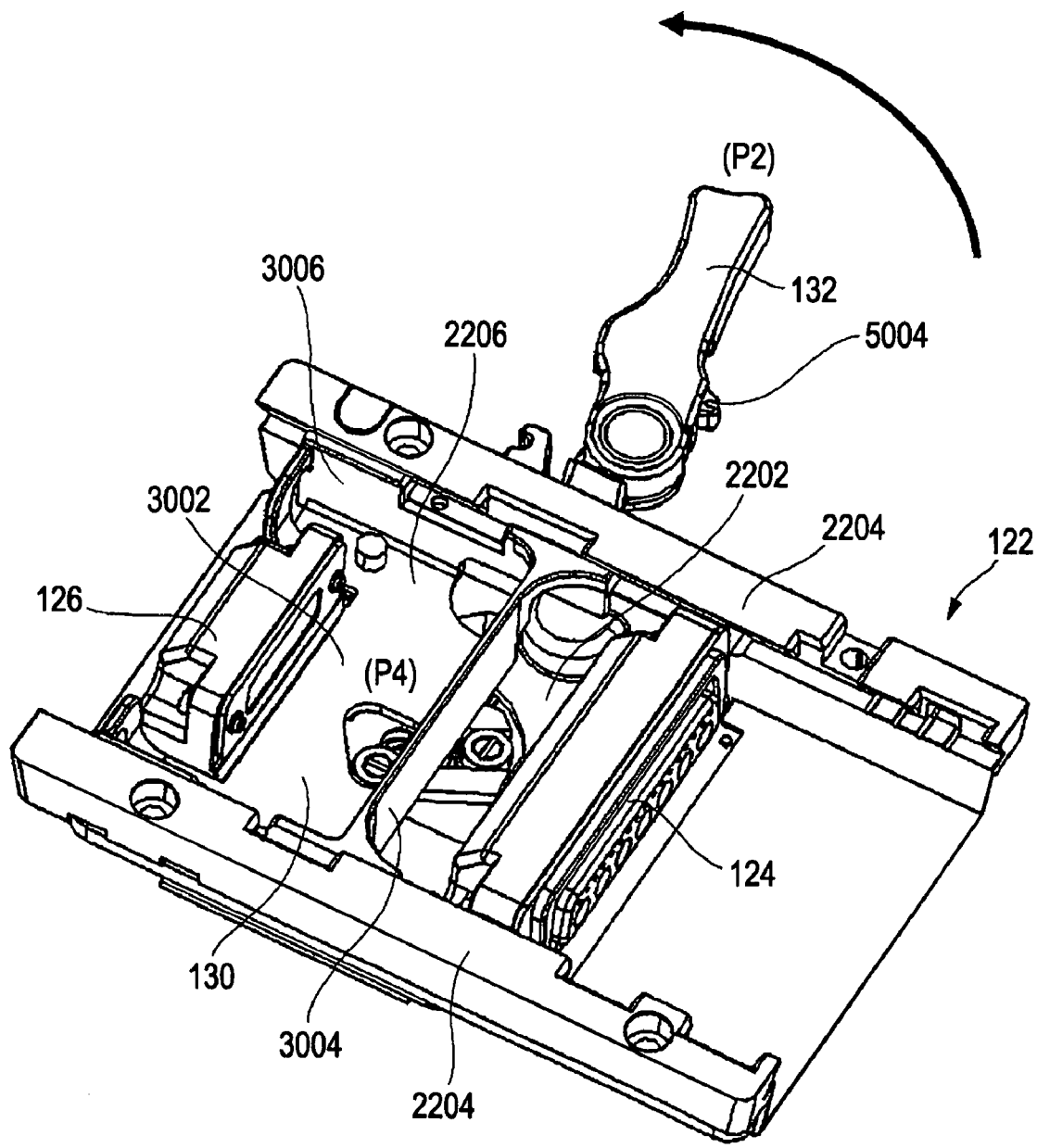
FIG. 22 also illustrates the operation of the control lever and ancillary device slider.
Figure 23:
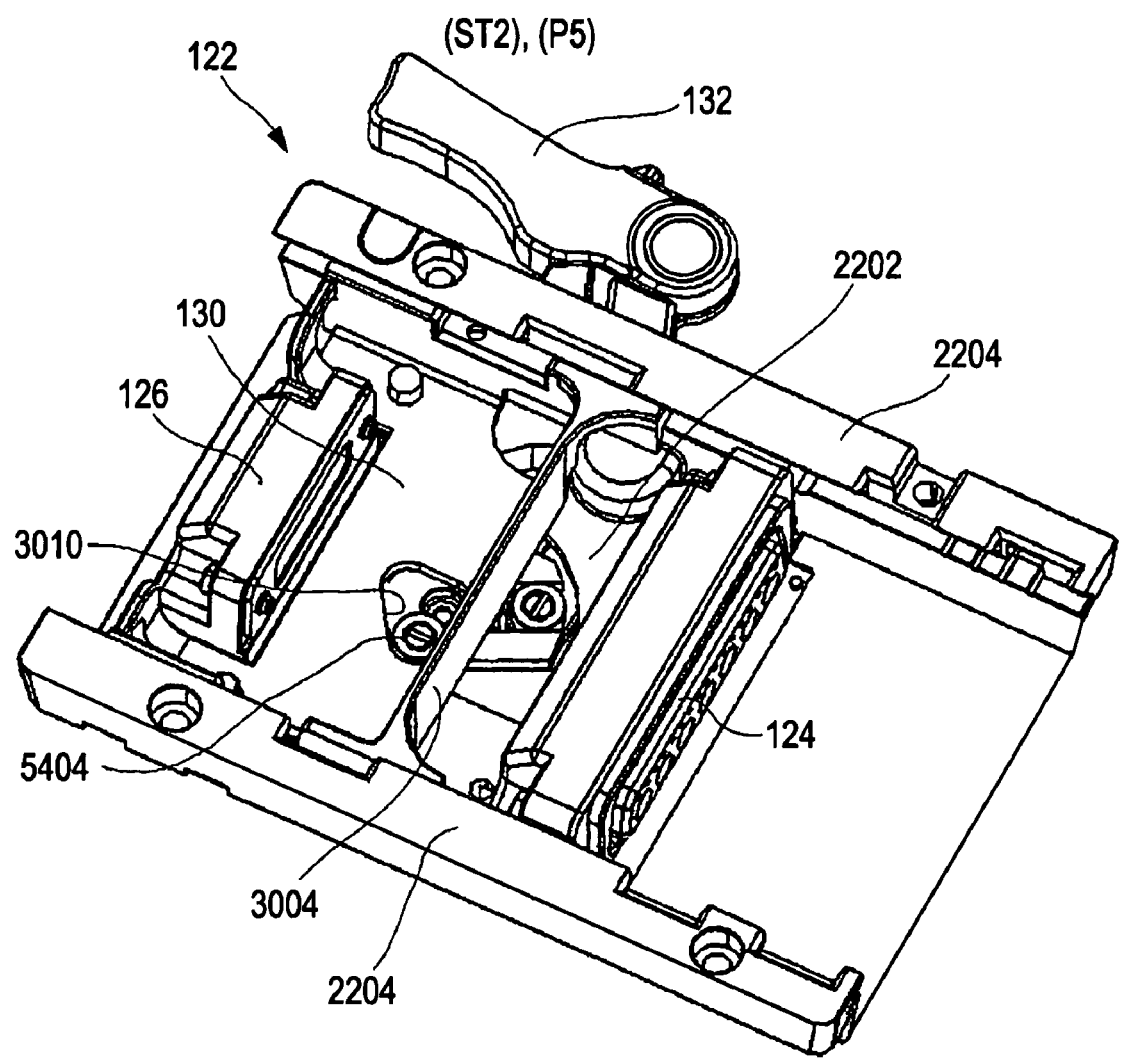
FIG. 23 also illustrates the operation of the control lever and ancillary device slider.
Figure 24:
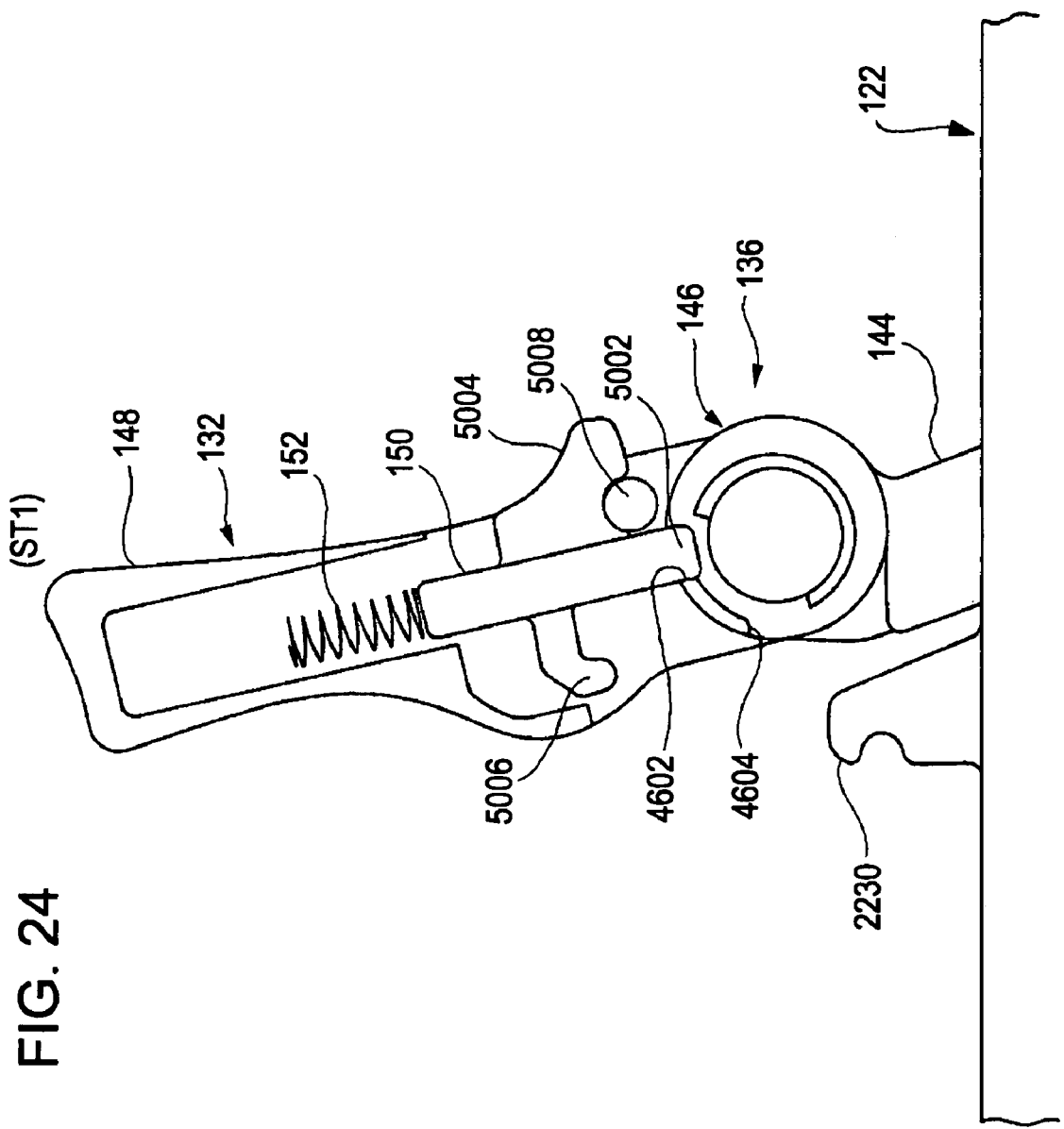
FIG. 24 illustrates the operation of a lever engagement/disengagement mechanism.
Figure 25:
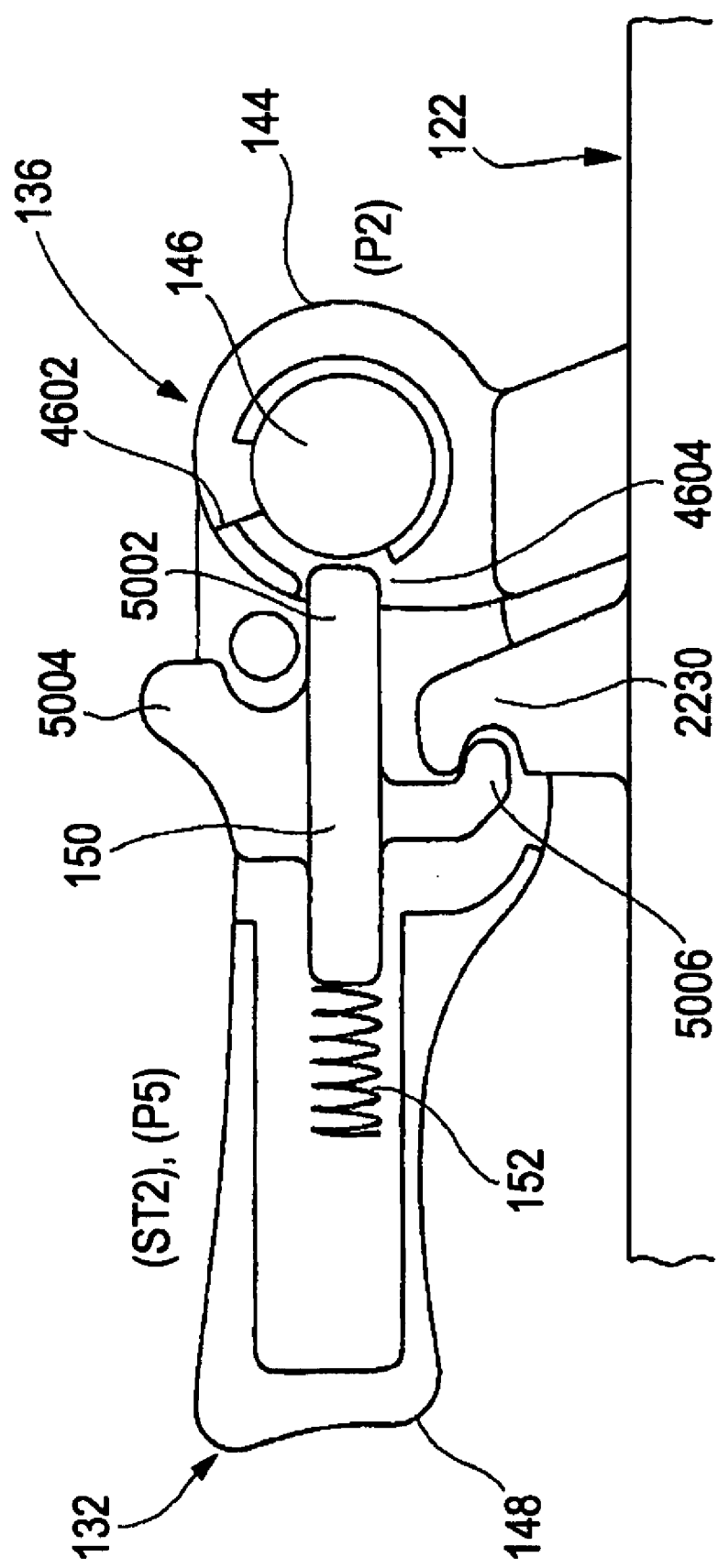
FIG. 25 also illustrates the operation of the lever engagement/disengagement mechanism.
Figure 26:
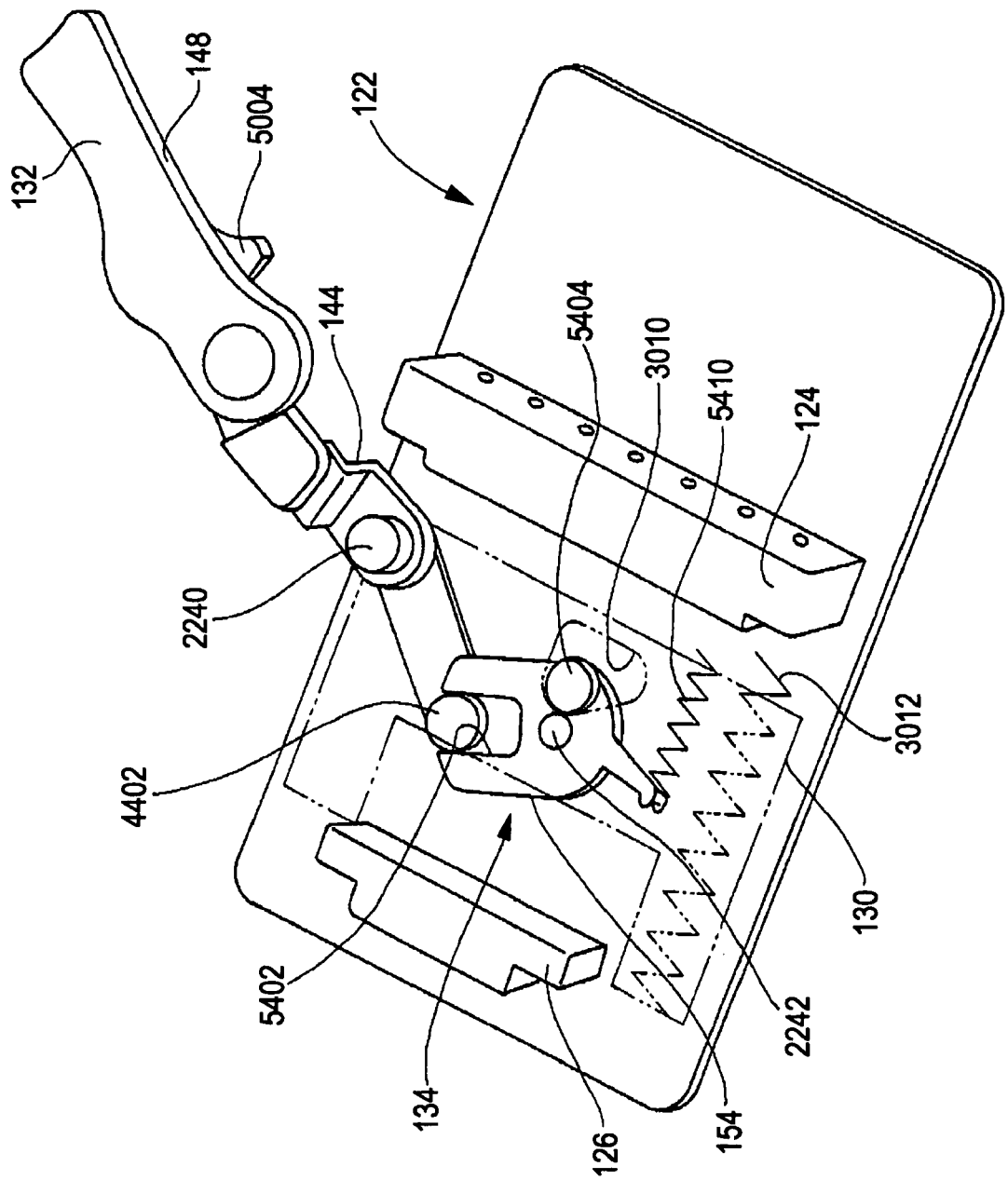
FIG. 26 illustrates the operation of a motion conversion mechanism.
Figure 27:
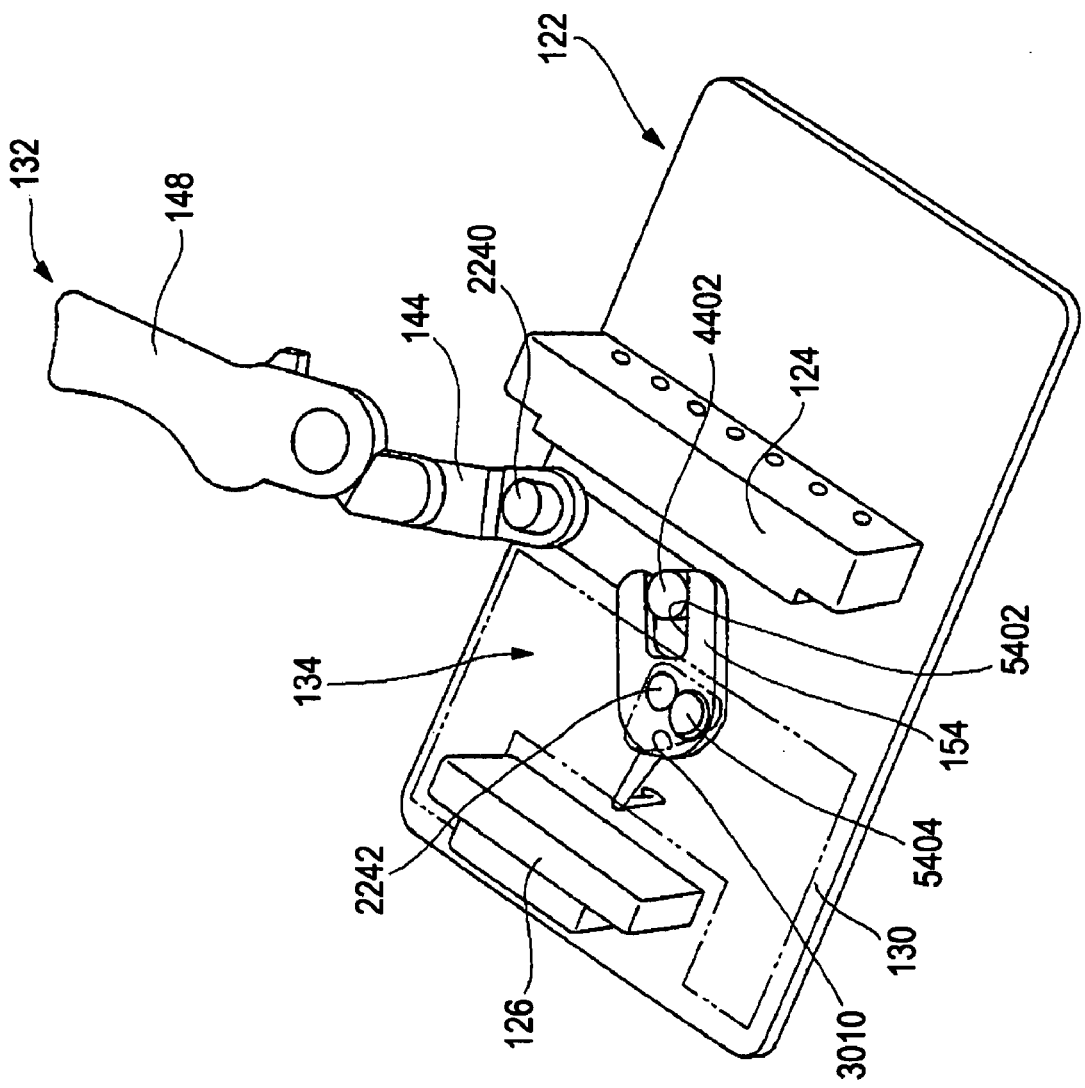
FIG. 27 also illustrates the operation of the motion conversion mechanism.
Figure 28:
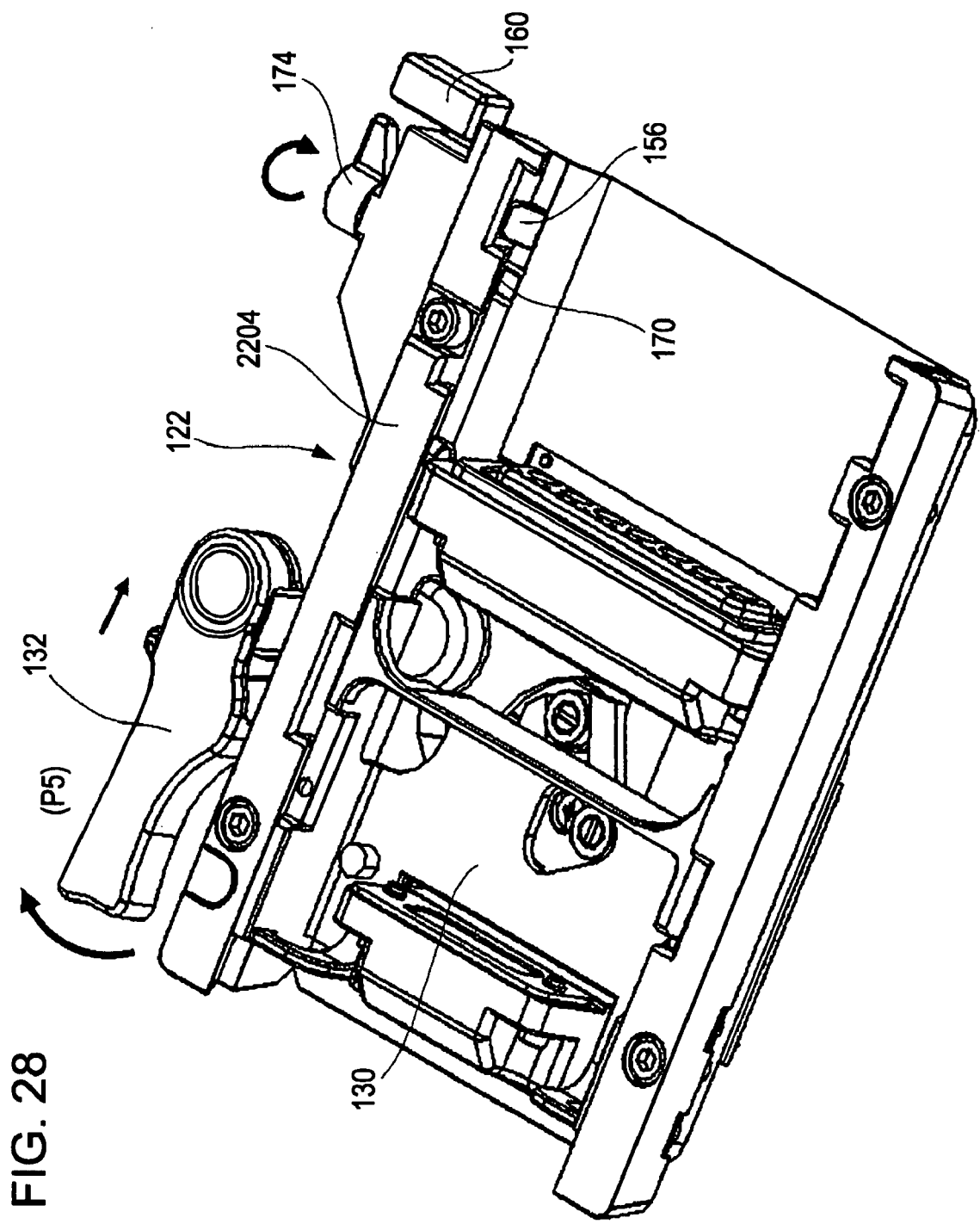
FIG. 28 illustrates the operation of a locking mechanism and a pressing mechanism.
Figure 29:
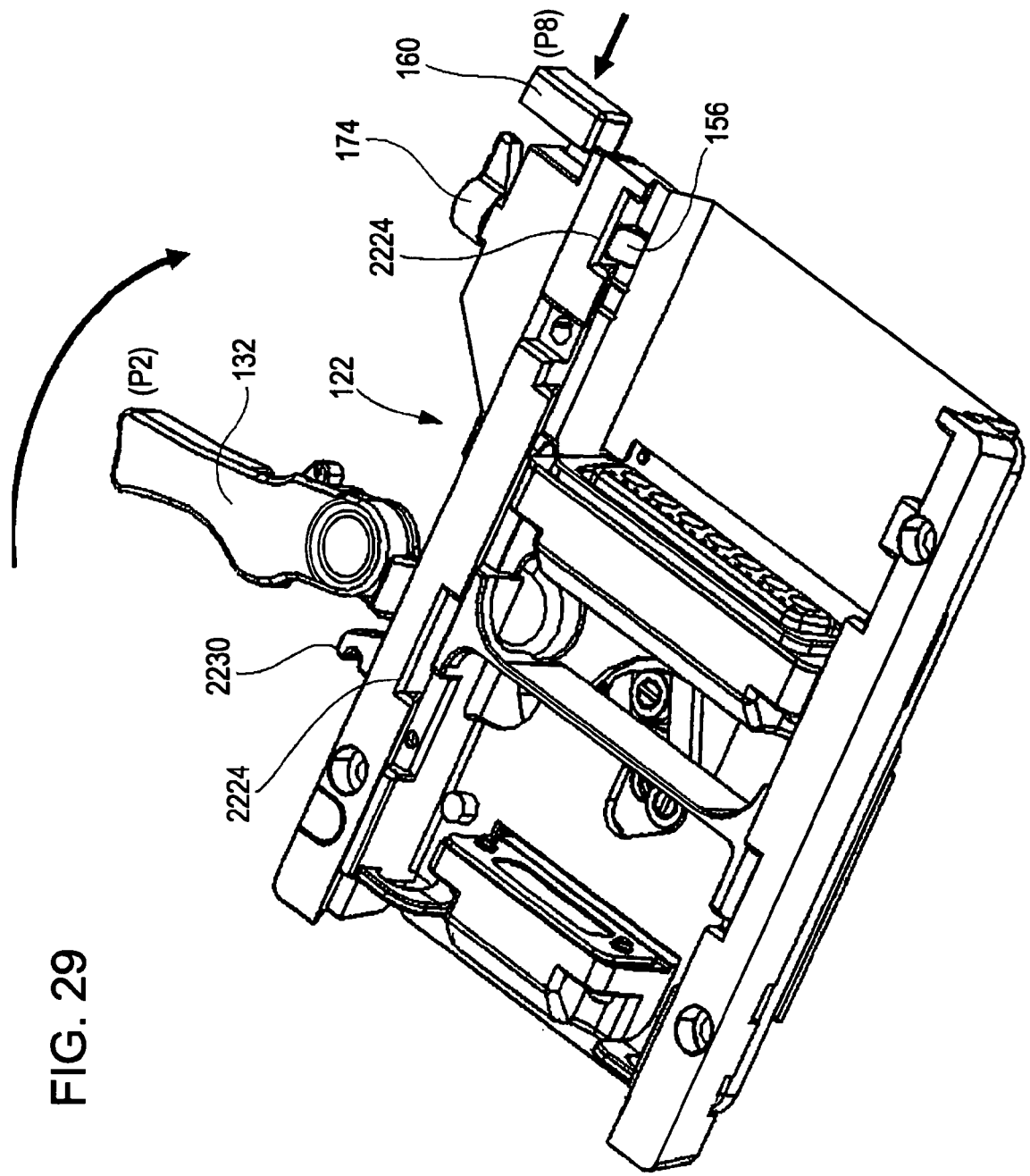
FIG. 29 also illustrates the operation of the locking mechanism and pressing mechanism.
Figure 30:
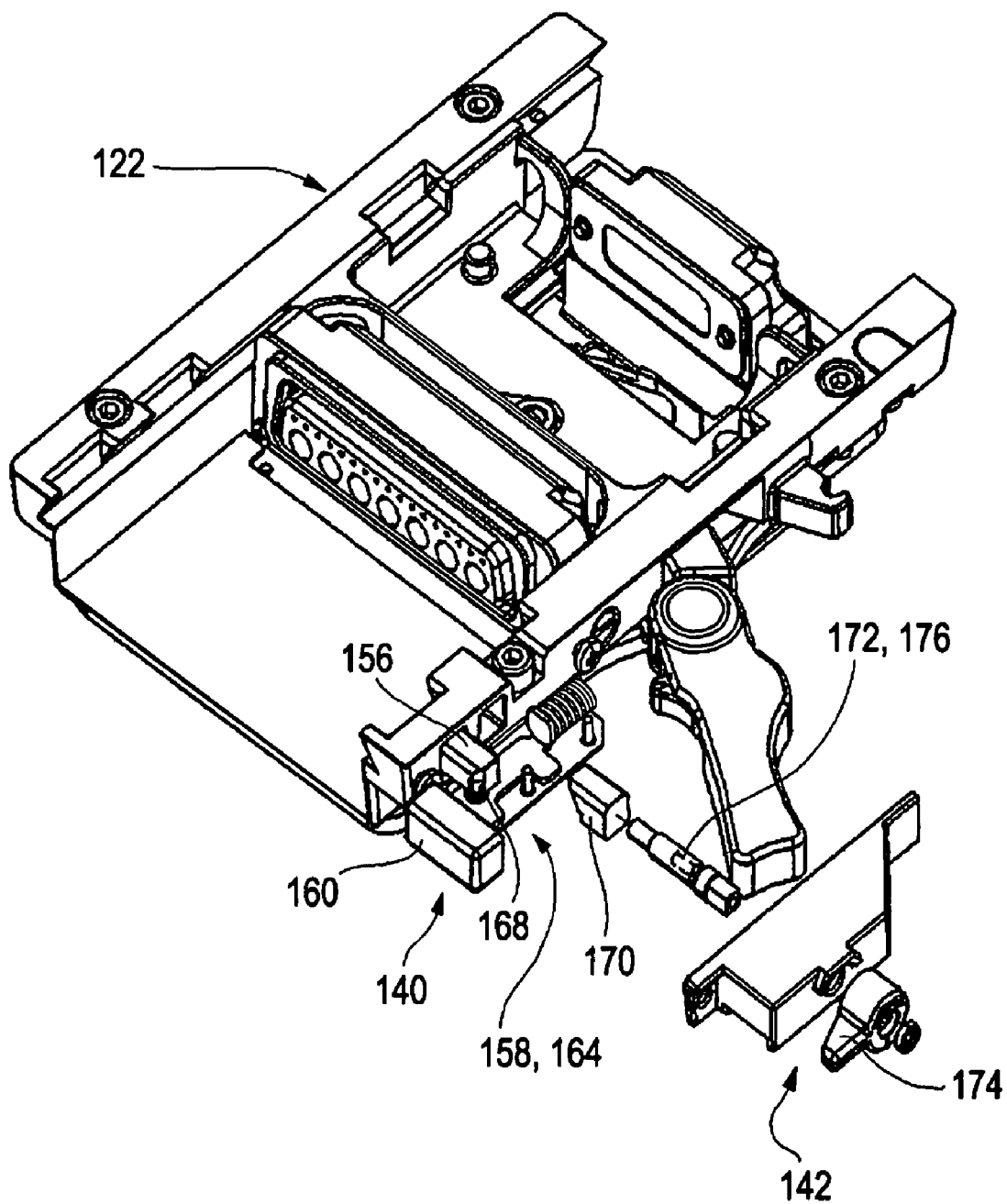
FIG. 30 is an exploded perspective view of the locking mechanism and pressing mechanism.
Figure 31:
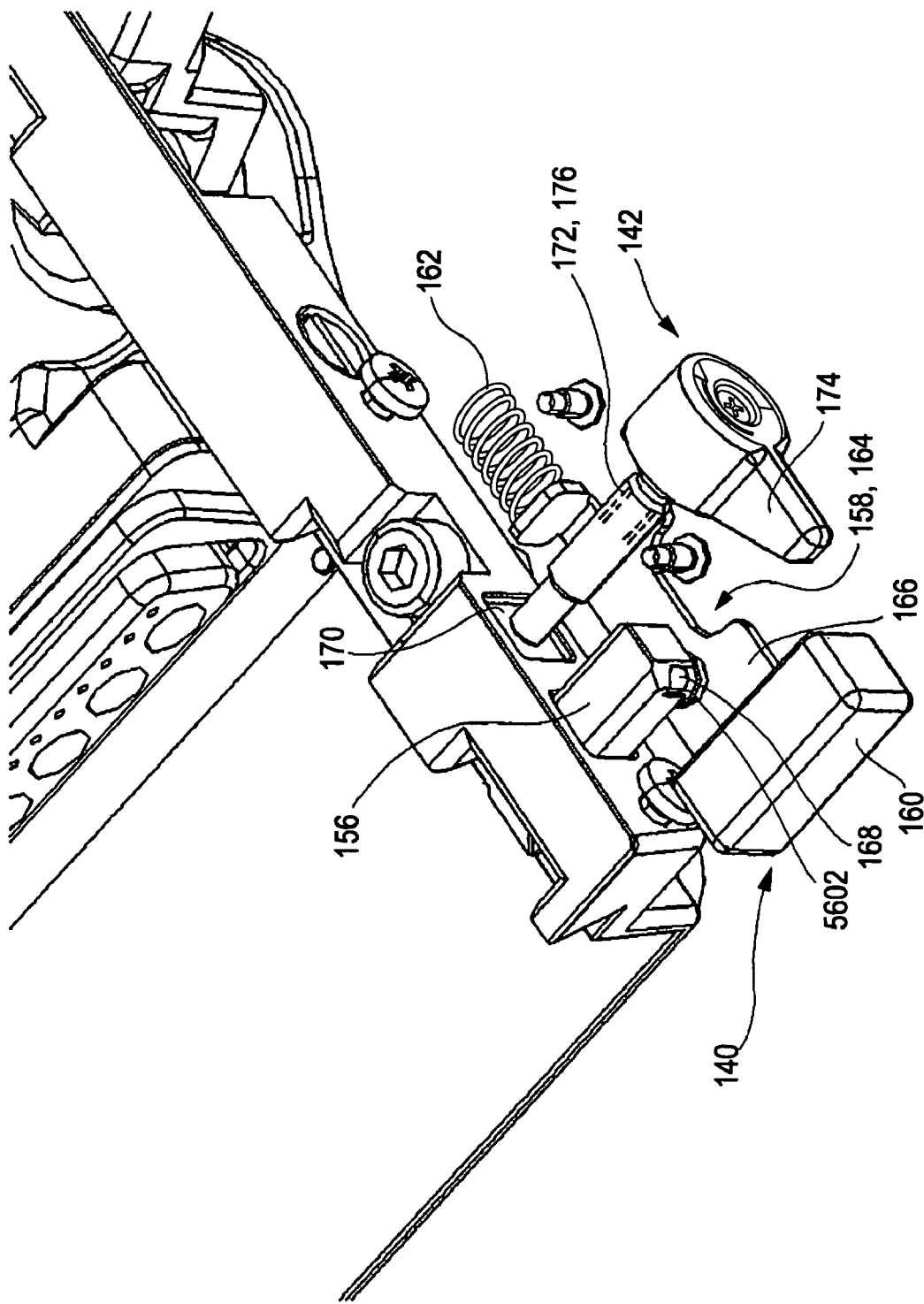
FIG. 31 is another exploded perspective view of the locking mechanism and pressing mechanism.
Figure 32:
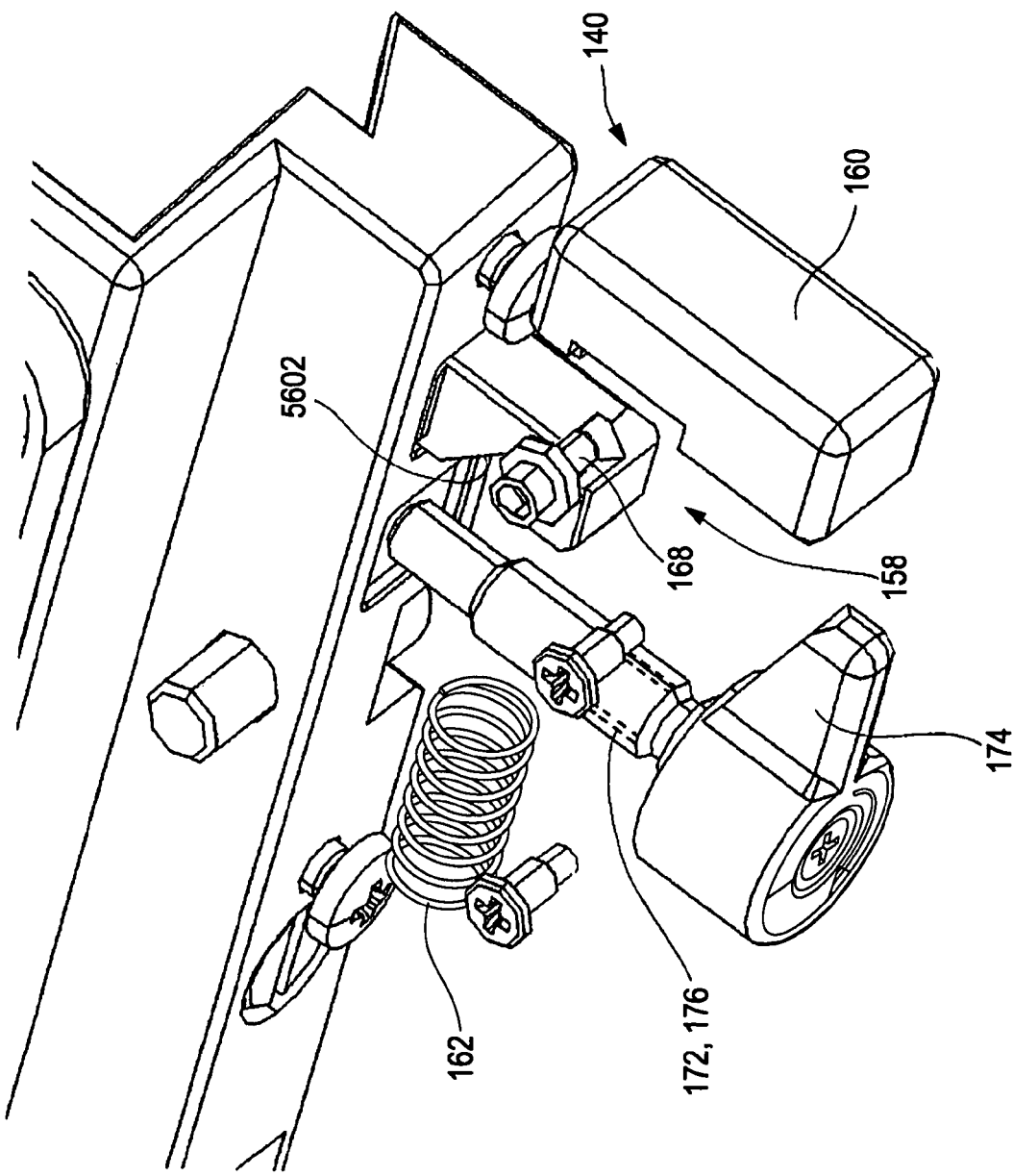
FIG. 32 is an exploded perspective view of the locking mechanism and pressing mechanism as viewed from below.
Figure 33:
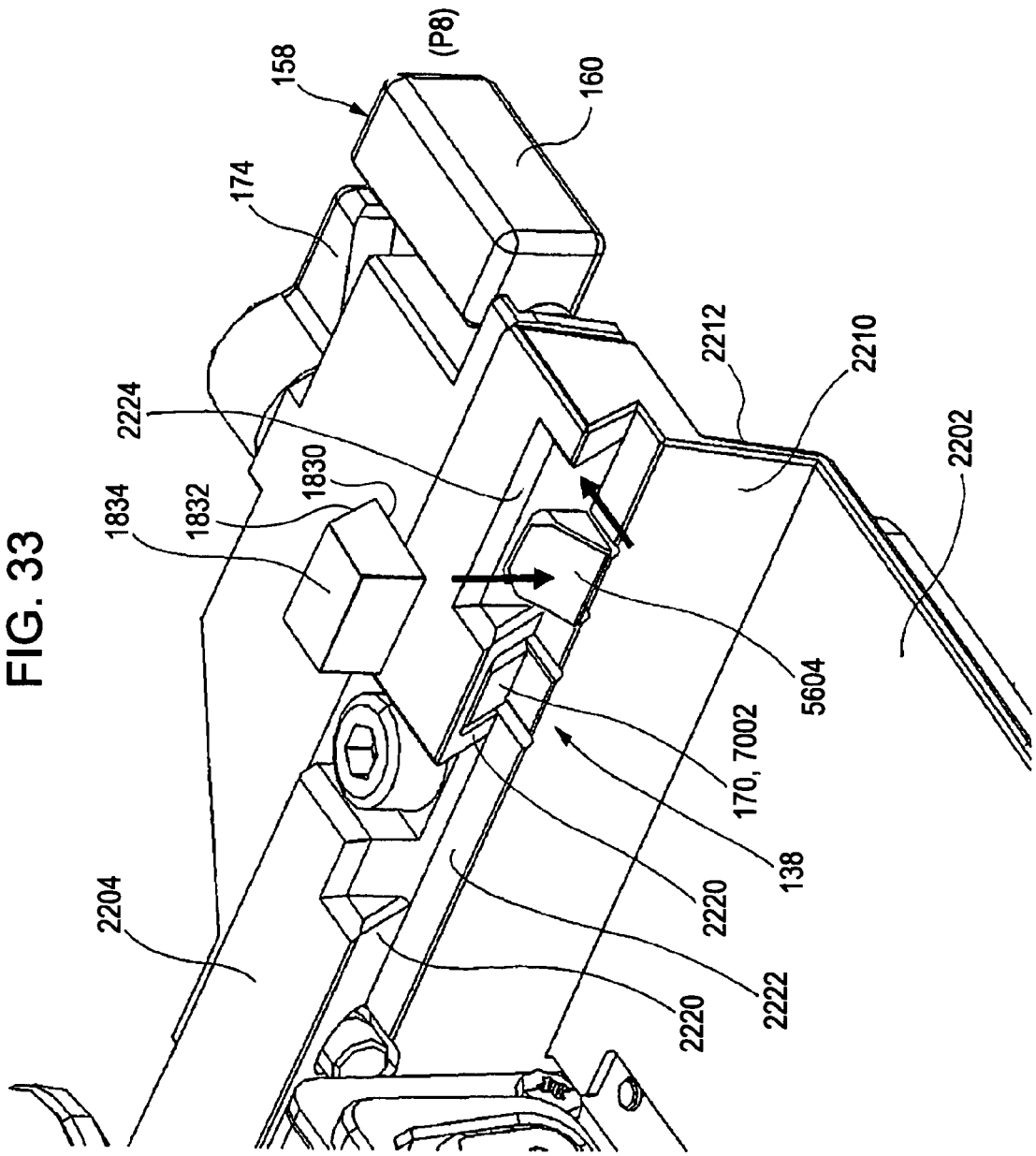
FIG. 33 illustrates the operation of the locking mechanism and pressing mechanism.
Figure 34:
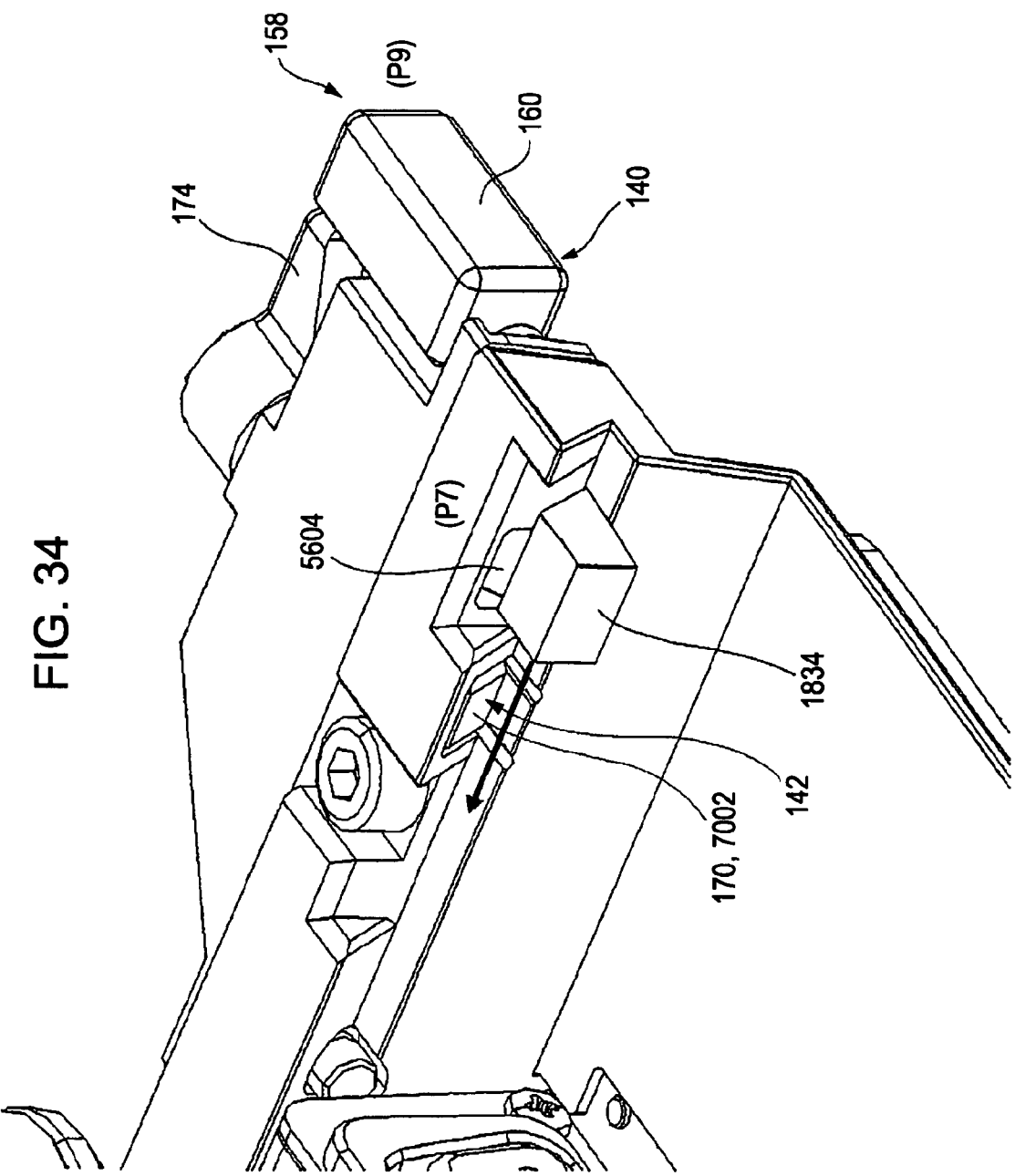
FIG. 34 also illustrates the operation of the locking mechanism and pressing mechanism.

FIG. 20 illustrates attachment and detachment of an ancillary device to and from the attachment part 122. FIG. 21 through FIG. 23 illustrate operations of a control lever 132 and an ancillary device slider 130. FIG. 24 and FIG. 25 illustrate operations of a lever engagement/disengagement mechanism 136. FIG. 24 and FIG. 25 illustrate operations of a lever engagement/disengagement mechanism 136. FIG. 26 and FIG. 27 illustrate operations of a motion conversion mechanism 134. FIG. 28 and FIG. 29 illustrate operations of a locking mechanism 140 and a pressing mechanism 142. FIG. 30 and FIG. 31 are exploded perspective views of the locking mechanism 140 and pressing mechanism 142. FIG. 32 is an exploded perspective view of the locking mechanism 140 and pressing mechanism 142 as viewed from below. FIG. 33 through FIG. 35 illustrate operations of the locking mechanism 140 and pressing mechanism 142.

The attachment part 122 includes the ancillary device slider 130 (see FIG. 21), control lever 132 (see FIG. 21), motion conversion mechanism 134 (see FIG. 26), and lever engagement/disengagement mechanism 136 (see FIG. 24).

In the present embodiment, the attachment part 122 further includes an engagement part 138 (see FIG. 33), locking mechanism 140 (see FIG. 35), and pressing mechanism 142 (see FIG. 34).

The ancillary device slider 130 is provided in the attachment part 122 such that it can linearly reciprocate. The ancillary device slider 130 is engageable/disengageable with/from an ancillary device. The ancillary device slider 130 engages with the ancillary device to cause it to linearly move together.

The control lever 132 is provided swingably between a first swing position P1 (see FIG. 21) and a second swing position P2 (see FIG. 22).

The motion conversion mechanism 134 (see FIG. 26) causes the ancillary device slider 130 to linearly move in synchronization with the swing of the control lever 132. More specifically, when the control lever 132 is located at the first swing position P1, the ancillary device slider 130 is located at an engaging/disengaging position P3 (see FIG. 21) at which ancillary-device-side connectors of the ancillary device are separated from the main-body-side connectors and the ancillary device is engaged with or disengaged from the ancillary device slider 130; while when the control lever 132 is located at the second swing position P2, the ancillary device slider 130 is located at a connection position P4 (see FIG. 22) at which the ancillary-device-side connectors are connected to the main-body-side connectors.

The lever engagement/disengagement mechanism 136 (see FIG. 24) is disengageably engaged with the control lever 132 when the ancillary device slider 130 is located at the connection position P4. The lever engagement/disengagement mechanism 136 thus causes the control lever 132 to be held at the second swing position P2.

As illustrated in FIG. 21 and FIG. 22, the attachment part 122 has a bottom wall 2202, side walls 2204 rising from opposite sides of the bottom wall 2202 and extending in the moving direction of the ancillary device slider 130, and mounting space 2206 formed on the bottom wall 2202 and between the side walls 2204.

A signal connector 124 and a power supply connector 126, which are main-body-side connectors on the bottom wall 2202, are spaced apart in the moving direction of the ancillary device slider 130. The signal connector 124 and power supply connector 126 extend in a direction orthogonal to the extending direction of the side walls 2204.

(Configuration of Side Walls and Engagement Part)

As illustrated in FIG. 20 and FIG. 33, the side walls 2204 on opposite sides have respective inner surfaces 2210 facing each other on the bottom wall 2202 and outer surfaces 2212 opposite the respective inner surfaces 2210.

An inclined surface 2220 and a flat surface 2222 are provided above the inner surface 2210 of each side wall 2204. The inclined surface 2220 is inclined toward the outer surface 2212 as it approaches the bottom wall 2202. The inclined surface 2220 extends in the moving direction of the ancillary device slider 130. The flat surface 2222 starts at an edge of the inclined surface 2220 closer to the bottom wall 2202, extends parallel to the bottom wall 2202 and also in the moving direction of the ancillary device slider 130, and reaches an edge of the inner surface 2210 remote from the bottom wall 2202.

The flat surface 2222 serves as a surface for positioning the attachment part 122 in a direction orthogonal to the bottom wall 2202.

As illustrated in FIG. 20, FIG. 21, and FIG. 33, each of the side walls 2204 on opposite sides provides two cut-out portions 2224 for allowing the ancillary device to be detached from the attachment part 122 at the engaging/disengaging position P3. Each cut-out portion 2224 is formed by removing, from the side wall 2204, an upper portion including part of the inclined surface 2220 while leaving the flat surface 2222 and a portion below the flat surface 2222 and adjacent to the bottom wall 2202.

With the ancillary device slider 130 located at the engaging/disengaging position P3 (see FIG. 21), four engagement blocks 1834 (see FIG. 33 (or FIG. 8)) of the ancillary device pass through their corresponding cut-out portions 2224 toward the bottom wall 2202 in a direction orthogonal thereto. Then, when flat surfaces 1830 of the engagement blocks 1834 are placed on the corresponding flat surfaces 2222 of the side walls 2204, the ancillary device is attached to the attachment part 122 and engaged with the ancillary device slider 130. On the other hand, when the ancillary device is detached from the attachment part 122, the four engagement blocks 1834 of the ancillary device pass through their corresponding cut-out portions 2224 in a direction orthogonal to and away from the bottom wall 2202 and are detached from the ancillary device slider 130.

When the ancillary device slider 130 is moved to the connection position P4 (see FIG. 22), an inclined surface 1832 (see FIG. 33) of each engagement block 1834 is engaged with an inclined surface 2220 of each side wall 2204. When the ancillary device is located at the connection position P4, a movement of the ancillary device in a direction orthogonal to and away from the bottom wall 2202 is blocked.

In the present embodiment, the engagement part 138 (see FIG. 33) includes an inclined surface 2220 and a cut-out portion 2224. When the ancillary device is located at the connection position P4 (see FIG. 22), the engagement part 138 is engaged with the ancillary device and blocks a movement of the ancillary device in a direction orthogonal to and away from the bottom wall 2202. When the ancillary device is located at the engaging/disengaging position P3 (see FIG. 21), the engagement part 138 is disengaged from the ancillary device and allows a movement of the ancillary device in a direction orthogonal to and away from the bottom wall 2202.

The engagement part 138 is provided in each of the side walls 2204 on both sides of the bottom wall 2202.

(Configuration of Ancillary Device Slider)

As illustrated in FIG. 21, the ancillary device slider 130 includes a main-body plate portion 3002 located over the bottom wall 2202 and a rising portion 3004 rising from the main-body plate portion 3002.

In the present embodiment, as illustrated, the main-body plate portion 3002 is formed to be located between the signal connector 124 and the power supply connector 126 on the bottom wall 2202. Side portions 3006 rise from opposite sides of the main-body plate portion 3002, the opposite sides being located in a direction orthogonal to the moving direction of the ancillary device slider 130.

The side portions 3006 are engaged with their corresponding inner surfaces 2210 of the side walls 2204, while the main-body plate portion 3002 placed over the bottom wall 2202 is engaged therewith. This allows the ancillary device slider 130 to be linearly movably guided. Alternatively, the side portions 3006 are engaged with their corresponding inner surfaces 2210 of the side walls 2204, while lower ends of the side portions 3006, the lower ends protruding downward from the main-body plate portion 3002 are engaged with the bottom wall 2202. This also allows the ancillary device slider 130 to be linearly movably guided.

The rising portion 3004 rises from an edge of the main-body plate portion 3002, the edge being located in the moving direction of the ancillary device slider 130.

By allowing the rising portion 3004 to be disengageably engaged with the engagement groove 1820 of the block 1822 (see FIG. 8), the ancillary device is linearly moved together with the ancillary device slider 130.

(Configuration of Control Lever)

As illustrated in FIG. 24 through FIG. 27, the control lever 132 includes a main lever 144 and a sub-lever 148. The main lever 144 is swingably attached, at its middle section in the longitudinal direction, to the attachment part 122. The sub-lever 148 for swinging operation is swingably attached to an annular shaft support 146 provided at an end in the longitudinal direction of the main lever 144.

As illustrated in FIG. 24 and FIG. 25, an anchoring slider 150 is included in the sub-lever 148 such that the anchoring slider 150 can linearly reciprocate in the longitudinal direction of the sub-lever 148. At the same time, a spring 152 for biasing the anchoring slider 150 toward the shaft support 146 is included in the sub-lever 148.

A first anchoring groove 4602 and a second anchoring groove 4604 are formed along the rim of the shaft support 146 with a space therebetween.

The anchoring slider 150 has a first anchoring projection 5002 engageably and disengageably anchored in the first anchoring groove 4602 and second anchoring groove 4604, an operation projection 5004 for allowing the anchoring slider 150 to linearly move, and a second anchoring projection 5006.

In FIG. 24, reference numeral 5008 denotes a stopper pin for controlling the maximum projecting position of the anchoring slider 150.

When the first anchoring projection 5002 is anchored in the first anchoring groove 4602 as illustrated in FIG. 24, the main lever 144 and the sub-lever 148 are in a first connection state ST1 in which the sub-lever 148 is located on the extension of the main lever 144.

When the first anchoring projection 5002 is anchored in the second anchoring groove 4604 as illustrated in FIG. 25, the main lever 144 and the sub-lever 148 are in a second connection state ST2 in which the sub-lever 148 extends in a bending direction of the main lever 144.

Therefore, there is provided a first engagement/disengagement mechanism capable of allowing the main lever 144 and sub-lever 148 to be selectively brought into the first connection state ST1 or the second connection state ST2. The first engagement/disengagement mechanism includes the anchoring slider 150, spring 152, first anchoring groove 4602, and second anchoring groove 4604.

Additionally, when the control lever 132 (i.e., the main lever 144) is located at the second swing position P2, if the main lever 144 and the sub-lever 148 are brought into the second connection state ST2 as illustrated in FIG. 25, the sub-lever 148 is moved to a retracted position P5, that is, moved closer to the attaching part 122 and extends along the attachment part 122.

The attachment part 122 provides an attachment-part-side anchoring portion 2230 which is disengageably engaged with the second anchoring projection 5006 when the sub-lever 148 is located at the retracted position P5.

Therefore, there is provided a second engagement/disengagement mechanism capable of disengageably engaging with the sub-lever 148 when the sub-lever 148 is located at the retracted position P5 and thus allowing the sub-lever 148 to be held at the retracted position P5. The second engagement/disengagement mechanism includes the second anchoring projection 5006 and the attachment-part-side anchoring portion 2230.

The lever engagement/disengagement mechanism 136 includes the first engagement/disengagement mechanism and the second engagement/disengagement mechanism described above.

(Configuration of Motion Conversion Mechanism)

As illustrated in FIG. 26 and FIG. 27, the motion conversion mechanism 134 includes a first lever 154 that is swingably attached to the attachment part 122, engaged with the control lever 132 and ancillary device slider 130, and causes the ancillary device slider 130 to linearly reciprocate in synchronization with the swing of the control lever 132.

More specifically, a middle section of the main lever 144 included in the control lever 132 is swingably attached to the attachment part 122 through a spindle 2240. A half of the main lever 144 in the longitudinal direction thereof protrudes outward from the attachment part 122 and is connected to the sub-lever 148, while the other half of the main lever 144 in the longitudinal direction thereof is placed on a concave portion of the bottom wall 2202.

The first lever 154 is placed on the concave portion of the bottom wall 2202 through a spindle 2242.

The control lever 132 and the first lever 154 are brought into engagement when a roller 4402 provided in the other half of the main lever 144 in the longitudinal direction thereof is engaged with a cam groove 5402 in the first lever 154.

The first lever 154 and the ancillary device slider 130 are brought into engagement when a roller 5404 provided in the first lever 154 is engaged with a cam groove 3010 in the ancillary device slider 130, as is also illustrated in FIG. 23.

As illustrated in FIG. 26, there is provided a spring 3012 for biasing the ancillary device slider 130 to the engaging/disengaging position P3 (see FIG. 21).

Additionally, there is provided a spring 5410 for biasing the first lever 154 such that the ancillary device slider 130 is moved to the engaging/disengaging position P3.

(Configuration of Locking Mechanism)

The locking mechanism 140 is provided in the attachment part 122 and prevents the ancillary device from moving toward the engaging/disengaging position P3 when the ancillary device is located at the connection position P4.

As illustrated in FIG. 30, FIG. 31, and FIG. 32, the locking mechanism 140 includes a lock slider 156 and a protruding/withdrawing mechanism 158.

The lock slider 156 is provided in a side wall 2204 in such a manner that it can protrude and withdraw with respect to the mounting space 2206 between a locking position P6 (see FIG. 35) and a retracted position P7 (see FIG. 34). The locking position P6 is a position at which the lock slider 156 is engaged with a surface of the ancillary device facing toward the engaging/disengaging position P3 when the ancillary device is located at the connection position P4. The retracted position P7 is a position at which the lock slider 156 is retracted from the mounting space 2206 into the side wall 2204.

In the present embodiment, as illustrated in FIG. 35, the surface of the ancillary device with which the lock slider 156 is engaged at the locking position P6 is an end surface 1836 of the engagement block 1834 of the ancillary device.

The protruding/withdrawing mechanism 158 causes the lock slider 156 to protrude to or withdraw from the mounting space 2206.

The protruding/withdrawing mechanism 158 includes a release lever 160, a spring 162, and an interlocking mechanism 164. The release lever 160 is arranged to be movable between an initial position P8 (see FIG. 35) and a pressed position P9 (see FIG. 34). As illustrated in FIG. 31, the spring 162 biases the lock slider 156 to the locking position P6 (see FIG. 35) and also biases the release lever 160 to the initial position P8 (see FIG. 35). The interlocking mechanism 164 is configured to connect the release lever 160 and the lock slider 156. The interlocking mechanism 164 allows the lock slider 156 to be located at the locking position P6 when the release lever 160 is located at the initial position P8 and allows the lock slider 156 to be located at the retracted position P7 when the release lever 160 is located at the pressed position P9.

As illustrated in FIG. 31, a slide plate 166 is attached to the release lever 160. The slide plate 166 is provided with a cam pin 168 protruding therefrom. Therefore, the cam pin 168 is moved together with the release lever 160.

The interlocking mechanism 164 includes the cam pin 168 and a cam groove 5602 (see FIG. 32) formed in the lock slider 156 and engaged with the cam pin 168. The cam groove 5602 allows the lock slider 156 to be located at the locking position P6 when the release lever 160 is located at the initial position P8 and allows the lock slider 156 to be located at the retracted position P7 when the release lever 160 is located at the pressed position P9.

In the present embodiment, a cam surface 5604 (see FIG. 33) is provided at an end of the lock slider 156. When the ancillary device is engaged with the ancillary device slider 130 located at the engaging/disengaging position P3 (see FIG. 21), the cam surface 5604 is engaged with the ancillary device and allows the lock slider 156 to be moved from the locking position P6 (see FIG. 35) to the retracted position P7 (see FIG. 34).

The cam surface 5604 is engaged with the flat surface 1830 of the engagement block 1834 and is moved from the locking position P6 to the retracted position P7.

(Configuration of Pressing Mechanism)

The pressing mechanism 142 is provided in the attachment part 122. The pressing mechanism 142 presses the ancillary device located at the connection position P4 (see FIG. 22) against one of the opposite side walls 2204 to prevent looseness of the ancillary device.

As illustrated in FIG. 30 and FIG. 31, the pressing mechanism 142 includes a pressing slider 170, an internal thread 172, a handle 174, and an external thread 176. The pressing slider 170 is unrotatably provided in the side wall 2204 and around an axial center extending movably in a direction orthogonal to the moving direction of the ancillary device slider 130. The internal thread 172 is movable with the pressing slider 170 and has the axial center extending movably in the direction orthogonal to the moving direction of the ancillary device slider 130. The handle 174 is rotatably and axially immovably provided in the side wall 2204. The external thread 176 is rotatable with the handle 174 and is screwed into the internal thread 172.

Therefore, by operating the handle 174, the pressing slider 170 linearly moves and protrudes from the side wall 2204 to the mounting space 2206 or withdraws from the mounting space 2206 into the side wall 2204.

As illustrated in FIG. 33 and FIG. 34, in the present embodiment, an inclined surface 7002 engageable with the inclined surface 1832 of the engagement block 1834 is provided at an end of the pressing slider 170. By pressing the inclined surface 7002 against the inclined surface 1832 of the engagement block 1834, the ancillary device is pressed against one of the opposite side walls 2204.

(Attachment of Ancillary Device)

As illustrated in FIG. 21, the main lever 144 and the sub-lever 148 are in the first connection state ST1 (see also FIG. 24), the control lever 132 is located at the first swing position P1, and the ancillary device slider 130 is located at the engaging/disengaging position P3. Additionally, by operating the handle 174 (see FIG. 34), the pressing slider 170 is retracted into the side wall 2204.

Then, the ancillary device is moved such that the engagement blocks 1834 of the ancillary device are located above their corresponding cut-out portions 2224 (see FIG. 21) of the attachment part 122 and is moved closer to the bottom wall 2202.

Thus, one of the engagement blocks 1834 allows the lock slider 156 to move from the locking position P6 (see FIG. 35) to the retracted position P7 (see FIG. 34), the flat surface 1830 of the engagement block 1834 is engaged with the flat surface 2222 of one of the side walls 2204, and the rising portion 3004 of the ancillary device slider 130 is engaged with the engagement groove 1820 of the block 1822.

Next, as illustrated in FIG. 22, the control lever 132 is moved from the first swing position P1 (see FIG. 21) to the second swing position P2, while the ancillary device and the ancillary device slider 130 are moved to the connection position P4. When the ancillary device and the ancillary device slider 130 are located at the connection position P4, the ancillary-device-side connectors (i.e., the signal connector 32A or 66A and the power supply connector 32B or 66B) are connected to the main-body-side connectors (signal connector 124 and power supply connector 126), respectively.

When the ancillary device and the ancillary device slider 130 are located at the connection position P4, the operation projection 5004 (see FIG. 24) is operated to disengage the first anchoring projection 5002 from the first anchoring groove 4602, the sub-lever 148 is swung to anchor the first anchoring projection 5002 in the second anchoring groove 4604, and the main lever 144 and the sub-lever 148 are brought into the second connection state ST2. Thus, as illustrated in FIG. 23 and FIG. 25, the sub-lever 148 extends along the attachment part 122 at a position close to the attachment part 122, that is, the sub-lever 148 is located at the retracted position P5. Additionally, the second anchoring projection 5006 is engaged with the attachment-part-side anchoring portion 2230, and the sub-lever 148 is held at the retracted position P5.

Thus, the ancillary device is prevented from moving toward the engaging/disengaging position P3 and is firmly held at the connection position P4.

Moreover, since the sub-lever 148 is held at the retracted position P5, the sub-lever 148 (control lever 132) does not obstruct the operation of the video camera (image pickup apparatus 10). This is advantageous in enhancing the usability of the video camera.

In the present embodiment, when the ancillary device is located at the connection position P4 (see FIG. 22), the lock slider 156 protrudes toward the locking position P6 (see FIG. 35) to engage with the end surface 1836 of the engagement block 1834 and thus to block the movement of the ancillary device toward the engaging/disengaging position P3 (see FIG. 21). This allows the ancillary device to be firmly held at the connection position P4.

Additionally, in the present embodiment, when the ancillary device is located at the connection position P4, operating the handle 174 causes the pressing slider 170 to protrude toward the mounting space 2206. This causes the inclined surface 7002 of the pressing slider 170 to be pressed against the inclined surface 1832 of the engagement block 1834. This makes it possible to prevent looseness of the ancillary device located at the connection position P4.

That is, providing the locking mechanism 140 and the pressing mechanism 142 in the present embodiment is advantageous in enhancing the usability of the video camera (image pickup apparatus 10).

(Detachment of Ancillary Device)

First, as illustrated in FIG. 28, the pressing slider 170 is retracted into one of the side walls 2204 by operating the handle 174.

Next, as illustrated in FIG. 29 (see also FIG. 24 and FIG. 25), by operating the operation projection 5004, the first anchoring projection 5002 is disengaged from the second anchoring groove 4604, while the second anchoring projection 5006 is disengaged from the attachment-part-side anchoring portion 2230. Then, the main lever 144 and the sub-lever 148 are brought into the first connection state ST1 (see FIG. 24) by swinging the sub-lever 148.

Next, the release lever 160 is pressed from the initial position P8 (see FIG. 35) to the pressed position P9 (see FIG. 34), and the lock slider 156 is moved from the locking position P6 (see FIG. 35) to the retracted position P7 (see FIG. 34).

Then, with the release lever 160 pressed, the control lever 132 is swung from the second swing position P2 to the first swing position P1.

By swinging the control lever 132, the ancillary device slider 130 is moved from the connection position P4 (see FIG. 22) to the engaging/disengaging position P3 (see FIG. 21) through the first lever 154 (see FIG. 26 and FIG. 27). Thus, the ancillary-device-side connectors (i.e., the signal connector 32A or 66A and the power supply connector 32B or 66B) are separated from the main-body-side connectors (signal connector 124 and power supply connector 126), respectively, and the ancillary device is moved from the connection position P4 to the engaging/disengaging position P3.

Then, when the ancillary device is moved in a direction orthogonal to and away from the bottom wall 2202, the engagement blocks 1834 pass through their corresponding cut-out portions 2224 and thus, the ancillary device is detached from the attachment part 122.

In the present embodiment, the ancillary-device-side connectors (i.e., the signal connector 32A or 66A and the power supply connector 32B or 66B) of the ancillary device and the main-body-side connectors (signal connector 124 and power supply connector 126) of the main body 14 are connected and disconnected by a simple operation, such as swinging the control lever 132 between the first swing position P1 (see FIG. 21) and the second swing position P2 (see FIG. 22). This is advantageous in improving the operability.

Additionally, since the control lever 132 is held at the second swing position P2 (see FIG. 22) by the lever engagement/disengagement mechanism 136, it is possible to reliably maintain the connection between the ancillary-device-side connectors and the main-body-side connectors. This is advantageous in reliably maintaining the connection between connectors.

The weight of a recording/reproducing unit for recording high-quality picture data for movies and the like is relatively large (e.g., four or five kilograms). Therefore, the present embodiment is advantageous in improving the operability of the main body 14 and recording/reproducing unit 16.

It should be understood by those skilled in the art that various modifications, combinations, sub-combinations and alterations may occur depending on design requirements and other factors insofar as they are within the scope of the appended claims or the equivalents thereof.

What is claimed is:

1. A shooting system comprising:
a main body configured to perform shooting to generate picture data;
a recording/reproducing unit configured to record and reproduce the picture data; and
an interface box configured to perform transmission and reception of signals and/or power between the main body and an external device,
wherein the main body includes a first housing having a plurality of outer surfaces of different orientations including a front surface to receive a lens body,
a first surface providing a first attachment part and a second surface providing a second attachment part, each attachment part having main-body-side connectors;
the recording/reproducing unit has a second housing constituting an exterior thereof;
the second housing having a recording/reproducing-unit-side attachment part interchangeably attachable, one at a time, to the first attachment part and the second attachment part;
the recording/reproducing-unit-side attachment part having recording/reproducing-unit-side connectors interchangeably connectable to the main-body-side connectors of the first and second attachment parts, respectively;
the interface box has a third housing constituting an exterior thereof;
the third housing having an interface-box-side attachment part interchangeably attachable, one at a time, to the first attachment part and the second attachment part; and
the interface-box-side attachment part having interface-box-side connectors interchangeably connectable to the main-body-side connectors of the first and second attachment parts, respectively.

2. The shooting system according to claim 1, wherein the interface box has an external device connector connected to the external device; and
the transmission and reception of signals and/or power between the main body and the external device are performed through the main-body-side connectors, the interface-box-side connectors, and the external device connector.

3. The shooting system according to claim 1, wherein the first housing includes a signal processor configured to generate picture data to be recorded;
the second housing includes a recording/reproducing mechanism configured to record in a recording medium the picture data to be recorded supplied from the signal processor and reproduce the picture data from the recording medium, and a controller configured to control the recording/reproducing mechanism;
the third housing includes an interface unit configured to perform transmission and reception of signals between the main body and the external device;
the signals transmitted and received between the main body and the external device by the interface unit include audio data supplied from the external device; and
the controller causes the recording/reproducing mechanism to record, in the recording medium, the audio data supplied from the external device through the interface unit.

4. The shooting system according to claim 1, wherein the first housing includes a signal processor configured to generate picture data to be recorded;
the second housing includes a recording/reproducing mechanism configured to record in a recording medium the picture data to be recorded supplied from the signal processor and reproduce the picture data from the recording medium, and a controller configured to control the recording/reproducing mechanism;
the third housing includes an interface unit configured to perform transmission and reception of signals between the main body and the external device;
the signals transmitted and received between the main body and the external device by the interface unit include the picture data reproduced from the recording medium by the recording/reproducing mechanism; and
the controller causes the picture data reproduced from the recording medium by the recording/reproducing mechanism to be supplied through the interface unit to the external device.

5. The shooting system according to claim 1, wherein the first housing includes a signal processor configured to generate picture data to be recorded;
the second housing includes a recording/reproducing mechanism configured to record in a recording medium the picture data to be recorded supplied from the signal processor and reproduce the picture data from the recording medium, an image pickup device configured to pick up a subject image, and a controller configured to control the recording/reproducing mechanism;
the third housing includes an interface unit configured to perform transmission and reception of signals between the main body and the external device;
the signal processor performs preprocessing on picture signals supplied from the image pickup device to generate picture data, and encodes the preprocessed picture data to generate the picture data to be recorded;
the signals transmitted and received between the main body and the external device by the interface unit include the picture data preprocessed by the signal processor; and
the controller supplies the preprocessed picture data through the interface unit to the external device.

6. The shooting system according to claim 1, wherein a lens barrel including an imaging optical system is attached to the first housing, which includes an image pickup device configured to pick up a subject image guided by the imaging optical system to generate a picture signal and a signal processor configured to generate picture data to be recorded on the basis of the picture signal; and
the second housing includes a recording/reproducing mechanism configured to record in a recording medium the picture data to be recorded supplied from the signal processor and reproduce the picture data from the recording medium.

7. The shooting system according to claim 1, wherein the first housing includes a signal processor configured to generate picture data to be recorded;

the second housing includes a recording/reproducing mechanism configured to record in a recording medium the picture data to be recorded supplied from the signal processor and reproduce the picture data from the recording medium, and a controller configured to control the recording/reproducing mechanism and the signal processor;

the third housing includes an interface unit configured to perform transmission and reception of signals between the main body and the external device;

the signals transmitted and received between the main body and the external device by the interface unit are signals transmitted and received between the controller and the external device through the interface unit;

the external device is a remote control device; and the controller controls the recording/reproducing mechanism and the signal processor on the basis of a control signal supplied from the remote control device.

8. The shooting system according to claim 1, wherein the first housing includes a signal processor configured to generate picture data to be recorded;

the second housing includes a recording/reproducing mechanism configured to record in a recording medium the picture data to be recorded supplied from the signal processor and reproduce the picture data from the recording medium, and a controller configured to control the recording/reproducing mechanism and the signal processor;

the third housing includes an interface unit configured to perform transmission and reception of signals between the main body and the external device and an operation switch connected to the interface unit; and the controller controls the recording/reproducing mechanism and the signal processor in response to an operation of the operation switch detected through the interface unit.

9. The shooting system according to claim 1, wherein the first housing includes a signal processor configured to generate picture data to be recorded;

the second housing includes a recording/reproducing mechanism configured to record in a recording medium the picture data to be recorded supplied from the signal processor and reproduce the picture data from the recording medium, and a controller configured to control the recording/reproducing mechanism and the signal processor;

the third housing includes an interface unit configured to perform transmission and reception of signals between the main body and the external device and a display device connected to the interface unit; and the controller controls a display operation of the display unit through the interface unit according to operations of the recording/reproducing mechanism and the signal processor.

10. The shooting system according to claim 1, wherein the third housing provides an external power input connector connectable to an external power supply; and power supplied from the external power supply is supplied to the main body through the external power input connector, interface-box-side connectors, and main-body-side connectors.

11. The shooting system according to claim 1, wherein the third housing provides a battery attachment part to and from which a battery is attachable and detachable and a battery connector connected to the battery; and power supplied from the battery attached to the battery attachment part is supplied to the main body through the battery connector, interface-box-side connectors, and main-body-side connectors.

12. An interface box comprising:

a third housing constituting an exterior thereof, wherein the third housing includes an interface unit configured to perform transmission and reception of signals and/or power between an image pickup apparatus and an external device;

the third housing having an interface-box-side attachment part interchangeably attachable, one at a time, to a first attachment part and a second attachment part provided in a housing of the image pickup apparatus; and the interface-box-side attachment part having interface-box-side connectors interchangeably connectable to main-body-side connectors provided in both the first attachment part and the second attachment part.

* * * * *